United States Patent [19]

Church

[11] Patent Number: 4,525,425
[45] Date of Patent: Jun. 25, 1985

[54] WATER AND OIL REPELLENT METAL OXIDE-ORGANIC COMBINATION COATING SYSTEMS AND METHOD OF MAKING SAME

[75] Inventor: Peter K. Church, Cascade, Colo.

[73] Assignee: El-Chem Corporation, Cascade, Colo.

[21] Appl. No.: 262,778

[22] Filed: May 11, 1981

[51] Int. Cl.³ .............................................. B32B 9/00
[52] U.S. Cl. ................................ 428/428; 427/255.4; 427/299; 427/340; 427/343; 427/344; 427/372.2; 427/407.2; 427/416; 427/419.5; 427/429; 428/428; 428/432; 428/440; 428/469; 428/472; 428/484; 428/497; 428/689; 428/697
[58] Field of Search ............... 427/419.5, 429, 340, 427/343, 344, 407.2, 416, 373.2, 11, 455.4; 428/428, 484, 432, 497, 440, 689, 447, 469, 697, 472

[56] References Cited

U.S. PATENT DOCUMENTS

| | | | |
|---|---|---|---|
| 1,545,256 | 7/1925 | Hocker | 427/11 |
| 2,439,689 | 4/1948 | Hyde | 427/255.6 |
| 2,717,246 | 9/1955 | Kienle et al. | 427/419.5 |
| 3,041,140 | 6/1962 | Alexander | 427/11 |
| 3,522,075 | 7/1970 | Kiel | 427/419.5 |
| 3,671,205 | 6/1972 | Uchida et al. | 427/419.5 |
| 3,700,505 | 10/1972 | Kanter | 427/11 |
| 3,836,386 | 9/1974 | Roy | 427/419.5 |
| 3,920,869 | 11/1975 | Eckett | 427/419.5 |
| 3,968,297 | 7/1976 | Sauer | 427/419.5 |
| 3,984,608 | 10/1976 | Opitz | 427/419.5 |
| 3,993,835 | 11/1976 | Miedaner | 428/378 |
| 4,278,735 | 7/1981 | Marcantonio et al. | 427/419.5 |

*Primary Examiner*—Norman Morgenstern
*Assistant Examiner*—Janyce A. Bell
*Attorney, Agent, or Firm*—Max L. Wymore

[57] ABSTRACT

A hydrated metal oxide and/or hydroxide is applied by rubbing on to the surface of a substrate adapted to retain an oxide coating thereon and an organic compound is applied to the oxide coated substrate which is adapted to combine with the oxide coating thereon to provide a combined coating of oxide and organic compound which is water and oil repellent and abrasion resistant.

43 Claims, No Drawings

WATER AND OIL REPELLENT METAL OXIDE-ORGANIC COMBINATION COATING SYSTEMS AND METHOD OF MAKING SAME

BACKGROUND OF THE INVENTION

Many types of water and oil repellent coatings have been developed in the past for a wide variety of uses. Some of these have utilized silicone systems of one type or another. Others have involved the formation of metallic soaps. The present invention utilizes what is believes to be a different approach, in which a metal oxide and/or hydroxide is first bonded to a suitable substrate. This thin, normally invisible layer, is then treated with an organic, silicone or fluorocarbon compound to form a combination coating that is highly water and oil repellent and abrasion resistant in nature.

SUMMARY OF THE INVENTION

This invention covers a family of metal oxide-organic combination coating systems that can be used to form highly water and oil repellent surfaces on glass, ceramic, porcelain, metals, etc. These systems are best suited for surfaces that are mainly inorganic in nature. They are not particularly suitable for use on highly organic substrates such as plastics, rubber, wood, cloth, and the like. However, organic materials containing sizeable amounts of inorganics on or in the surface such as the oxides or metals found in most paints and enamels, often make excellent substrates for these coatings.

Applicant's coatings can be applied to the substrate using a two step process. The first step involves the application of a selected metal oxide, usually applied as a water based suspension of an oxide precipitate. The precipitates are gelatinous and have been referred to in the literature both as oxides and hydroxides. The oxide suspension is rubbed thoroughly onto the surface of the substrate until it is dry and no water or oxide is visible. The second step involves treating the oxide coated surface with any one or more of a very large number of organic, silicone, fluoro silicone or fluorcarbon compounds. These can be applied by a variety of means such as dipping, rubbing or exposing to vaporized fumes.

Examples of metal oxides and/or hydroxides suitable for the first application step include those of zirconium, aluminum, iron, chromium, tin, titanium, nickel, cobalt and cerium. Examples of suitable organics for the final application step include such diverse materials as stearic acid, sodium stearate, cetyl alcohol, methyl alcohol, 1,1,1-trichloroethane, naphtha or mineral spirits and many others. It has further been found that the organic final treatment can be substituted with an application of a silicone including dimethylsilicone, a fluorosilicone or fluorocarbon. Special coating formulations have also been developed that can be applied in a single application step.

The coatings of this invention are extremely water repellent, even in sea water, and have been found to exhibit substantial repellency to oil and grease, making such contamination easy to remove. In addition, when properly applied, the coatings have been found to show a very high degree of abrasion resistance compared to other coating systems that have been similarly evaluated.

A very unusual property of these coatings is their self-healing characteristics. For example, if a portion of the organic coating constituent should accidentally be removed by abrasion or by chemical attack, such as by a strong phosphate or alkali, the affected area will be found to rapidly regain its repellency again if an appropriate organic is brought into contact with the coating. Such organics may include soap, motor oil, and the like, or even oil from the skin and the organic need not necessarily be that used when forming the initial coating.

Applications of the coatings are quite varied but include protective coatings for eyeglass lenses, ceramic tiles, anti-drip surfaces on pouring spouts, and water repellent coatings for spark plugs and other types of electrical insulators.

DESCRIPTION OF THE INVENTION

The invention can perhaps be best understood by first explaining a manual application method of forming a water repellent coating on a clean, flat glass surface. A typical two step application process will be described.

The first step consists of the application and bonding of a suitable metal oxide layer to the glass surface. A specific example suitable for this purpose is a chemically precipitated and highly hydrated zirconium oxide prepared as a water based gelatinous suspension. The oxide is bonded to the glass by applying a small amount of the suspension to the surface, and rubbing the oxide onto the surface with a suitable applicator such as a clean cotton ball or pad. The rubbing is continued in a uniform manner over the entire surface to be treated, using moderate pressure, until the zirconium oxide suspension is transformed from its initially wet condition to an essentially dry or nearly dry stage. At this point, an invisible layer of the oxide will be firmly attached to the surface of the glass.

A metal oxide treated surface thus formed, is not itself water repellent. Repellancy is accomplished by applying any of a large number of organic materials to the previously applied oxide layer as a second and final step. A small amount of stearic acid dissolved in methyl alcohol is an example of a suitable organic compound. Such a solution can be applied to the oxide coated surface with a suitable applicator or by dipping, etc. The glass surface is then thoroughly air dried to evaporate the alcohol. Any residue remaining on the surface from an excess of the stearic acid in the original solution can be easily removed at this point by washing with soap and water. A highly water repellent and abrasion resistant coating will be found to be present on the glass surface treated in this manner.

The hydrated oxides that have been found to be most suitable for these coating systems are those of zirconium, chromium, iron, titanium, tin and aluminum. Since these oxides must be highly hydrated, they are most easily prepared as a chemical reaction product carried out in water solution. For example, a highly hydrated zirconium oxide can be prepared by chemically reacting a water solution of zirconium oxychloride in ammonium hydroxide. The reaction product in this case consists of the water insoluble oxide precipitate and water soluble ammonium chloride. The insoluble oxide can then be separated from the soluble portion by a variety of methods. The particular system that has been employed in the preparation of the oxides described in this disclosure simply involves passing the reaction products, while still in water solution, through filter paper placed in a vacuum operated Buchner funnel. After several washings with water to remove the soluble materials, the oxide precipitate or "filter cake" remaining on the paper is removed for use.

The filtered precipitate just described has been found to contain an unusually high percentage of water despite its appearance. Samples of the precipitate heated to about 250° F. for four hours in an oven have resulted in solid residues of only 6 or 7% by weight indicating the water content of about 93 to 94 percent by weight in the original material.

Even with this large water content, additional water may be desired in order to make the precipitate into a more easily applied suspension. A typical formulation is given below in which additional water has been thoroughly mixed with the zirconium oxide filtered precipitate to form a just barely flowable gelatinous suspension that will now provide a good overall result. This also includes the formulation set forth in Test 1 of Table III:

EXAMPLE 1

| | |
|---|---|
| Zirconium oxide, chemically precipitated, filtered and washed as described above. This material contains about 6 to 7% solids when heated at about 250° F. for four hours | 27.0 g |
| Methoxypolyethylene glycol, 5000 molecular weight | 0–0.03 g |
| Added distilled water | 0–23 g |

The preferred initial oxide coating treatment has been found to consist of a suspension in which water blended with the filtered precipitate has been varied between the limits of zero to 70%. This assumes that the zirconium oxide precipitate contains about 6 to 7% of solids and 93 to 94% water when heated at about 250° F. for about four hours.

The total water content of the suspension is, therefore, about 94% to 98.2% of the oxide that would remain if the suspension were sufficiently dried by heating. Tests using the initial oxide treatment containing added water in this preferred range can be seen by referring to Tests 1 through 6 of Table IIIA. Initial oxide treatment of this type can provide highly water repellent coatings with excellent bond strength and wear properties.

It should be pointed out that variations in the amount of water that remain with the initially prepared oxide precipitate can vary considerably depending on the method that is employed. For example, filtering without vacuum, pressure filtering or centrifuging of the oxide reaction product can make very noticeable differences in water content. Therefore, samples of the highly hydrated starting product should be evaluated for solids in order to more precisely determine the amount of added water to be used for optimum coating results.

Also variations can occur as a result of a particular chemical product selected for reaction, the amount of water used during the reaction and the type of oxide being precipitated.

It will be noted that a small amount of Methoxypolyethylene glycol has been incorporated in the typical formulation of Example 1. This additive provides less physical drag while applying the oxide to the substrate during the nearly dry to dry rubbing stage, but has very little effect on the water repellent, or abrasive wear resistant properties of the final coating. Polyethylene or alkoxypolyethylene glycol appear to make equally good lubricants in this respect and the amount or molecular weight are relatively non-critical. Coatings with and without glycol additives are shown in Table IIIA.

The terminology applied to these hydrated precipitated compounds in the literature is often confusing, that is the same material may be referred to as an oxide, such as $Al_2O_3 \cdot XH_2O$, in one instance, or as a hydroxide, such as $Al(OH)_3 \cdot XH_2O$ in another. The exact numbers of waters of hydration are also often indeterminate and can be effected by the particular means of preparation.

A number of highly hydrated complex oxides such as zirconium aluminate, zinc stannate and the like or a wide variety of oxide mixtures such as zirconium oxide and chromium oxide, chromium oxide and iron oxide, and the like, can also be employed to make highly water repellent and abrasion resistant coatings with the method of the invention. Some of these many possibilities are shown in Table III.

It should be re-emphasized that the metal oxide will only become strongly attached to the substrate when it is rubbed thoroughly onto the surface from the initial wet to a nearly dry or dry condition. For example, hydrated zirconium oxide when correctly rubbed in this way onto a glass surface cannot be removed by simply washing and rubbing with a wet sponge or towel. In fact, it is very difficult to remove even with strong abrasive action or chemical means.

While the exact bonding mechanism is not understood, it is believed that a molecular orientation of the highly hydrated oxide may be occurring between the oxide and/or hydroxide and the substrate during the rubbing operation. Very strong bonds have been found to result and this suggests that they are at least partly chemical or pseudo-chemical in nature. The bonding so evanescently approaches a chemical bond as to be in the nature of a chemical bond.

The organics found to be suitable for the second or final coating step and those that produce highly water repellent and abrasion resistant coatings in combination with the metal oxide layer include a very large number of organic compounds and materials. A few of the preferred examples but by no means all include stearic acid, cetyl alcohol, potassium myristate, methanol, acetone, 1,1,1,-trichloroethane, Stoddard solvent, hand soap and even oil from the skin. The organic compounds and materials that produce a high degree of water repellency and provide hard to remove coatings when used in this manner are exceedingly large in number and diverse in nature. Some of the organics used successfully during the course of the development as final coating treatments are listed in Table I. The organics include alcohols, ketones, hydrocarbons, halogenated hydrocarbons, fatty acids, fatty acid salts, animal oils, silicones, siloxanes, fluorocarbons, and mixtures thereof.

TABLE I

| Partial List Of Organic And Related Materials That Have Been Used As Final Coating Treatment |
|---|
| Stearic Acid |
| Palmitic Acid |
| Myristic Acid |
| Oleic Acid |
| Linoleic Acid |
| Linolenic Acid |
| Methyl Stearate |
| Potassium, sodium, ammonium and triethanolamine stearates |
| Potassium, sodium, ammonium and triethanolamine palmitates |
| Potassium, sodium, ammonium and triethanolamine myristates |
| Potassium, sodium, ammonium and triethanolamine oleates |
| n-hexadecane |

TABLE I-continued
Partial List Of Organic And Related Materials That Have Been Used As Final Coating Treatment Cetyl Alcohol
Lanolin
Acetone
Methyl ethyl keytone
methanol
isopropanol
2-Propanol
1-Pentanol
1,6-Hexanediol
Hexyl Alcohol
Heptal Alcohol
1,1,1-Trichloroethane
Tetrachloroethylene
Methyl Chloride
Methylene Chloride
Carbon Tetrachloride
Mineral spirits (naptha)
Mineral Oil
Paraffin
Motor Oil
Stoddard Solvent
Lanolin
Hand Soap, (IVORY, DIAL, etc.)
Skin Oils

| | |
|---|---|
| Polydimethylsiloxanes | General Electric Co., 500, 1000, 10,000 and 60,000 centistoke grades and SF-1093 with oxidation inhibitor, fluid |
| Dimethylsilicone wax | General Electric Co., SF-1134 |
| Methylalkylpolysiloxane | General Electric Co., SF-1091 fluid |
| Chlorophenylmethylsiloxane | General Electric Co., F-50 fluid |
| Fluorodimethylsiloxane | Dow Corning, FS-1265 - 1000 centistoke fluid |
| Fluorocarbon | Hooker Chemical Co., FLUOROLUBE, LG-160 fluid |
| Hydroxy terminated (SiOH) dimethyl reactive silicone | Union Carbide Corp. L-9000 fluid, 1000 centistoke grade |

Note:
Many of the materials listed above have been used in combination. For example, heavy fluids or solids have often been used in combination with an appropriate organic solvent to provide a more economic or a more easily applied mixture.

It has also been found that a number of materials not strictly classed as organics can be substituted for the organic materials as the final coating step. Examples are silicones (including dimethyl silicone of various molecular weights) fluorosilicones and fluorocarbons. A number of such compounds have also been included in Table I. Again a high degree of repellency and rub resistance has been found to result from their use.

While many of the highly effective final treatment materials are long molecular chain solids or heavy liquids at room temperature others are short chain, low viscidity fluids. Since only very small amounts of the organic, silicone or fluorocarbon are required to complete the coating, solids and heavier liquid materials are often most conveniently applied as the final treatment in solution form by dissolving in an appropriate solvent. This method not only allows easy and uniform application of the final treatment material but may also help considerably in removal of excess surface residue by properly adjusting the amount of the evaporative solvent employed.

It is interesting to note that some of the highly evaporative and very short molecular chain organics such as methanol, acetone, methyl ethyl keytone, and 1,1,1,-trichloroethane when used alone provide an excellent final coating treatment. It is, of course, possible that organic impurities, often inherent in small amounts in such solvents, are actually responsible for the excellent interaction with the previously applied metal oxide layer. However, high purity grades of methanol and 1,1,1,-trichloroethane have been found to provide equally as good water repellency and abrasive rub test data when used alone as a final coating treatment as did impure commercial grades of the same solvents. The latter comparisons consisted of a painter's grade of methanol and a household fabric spot remover labeled as containing 1,1,1,-trichloroethane. Both commercial products left a visible organic residue when allowed to evaporate on a clean glass surface while the high purity grades did not.

As a result of many tests, some of which will be described later, the best overall results have normally been obtained using final coating treatments consisting of a combination of an evaporative solvent plus a solid or viscous liquid from Table I. Two examples of highly effective final treatment solutions of this type are well dissolved mixtures containing:

(a) 50 g methanol
  0.25 g stearic acid, or
(b) 30 g methyl ethyl keytone
  0.15 g dimethylsilicone, 1000 centistoke Propylene glycol has also been found to make a suitable liquid "extender" where it may be desired to limit the amount of a more highly evaporative solvent. An example of such a mixture found to be generally useful may be prepared by thoroughly mixing the following in a high speed blender:

(a) 30 g propylene glycol
  20 g 1-propanol
  1 g stearic acid

Organic solutions of the types just described may be applied to the previously metal oxide treated glass surface by simply brushing, dipping, and the like. The solution should be left on the surface for sufficient time in order for the interaction with the oxide coated substrate to occur. This contact time, for optimum results, may range from several seconds to several minutes depending on the second treatment solution used. On flat smooth surface such as plate glass, this interaction will sometimes result in a visual separation of the organic solution on the surface as the repellency develops. The excess solution can then be washed off with a soap and water rinse followed by a final rinse of plain water. A coating containing a silicone or fluorocarbon may require more rigorous rubbing to remove the residual surface material. The completed coating will reach full or nearly full bond strength after one to several days at room temperature depending on the formulations involved. Accelerated curing can also be accomplished at elevated temperatures.

Method of applying a final treatment in non-solubilized form can also often be successfully used in combination with an elevated temperature cure. For example, stearic acid can simply be prepared in a finely powdered form and rubbed lightly on the oxide coated glass surface. The stearic acid will adhere as a thin cloudy film. During the subsequent cure cycle, a good interaction with the metal oxide layer will occur when the acid reaches its melting point. A few residual spots of uncombined stearic acid may be present after cooling to room temperature. These can be easily removed by rubbing with a cloth and soap and water. The resulting coating should again be optically clear and highly water repellent and abrasion resistant.

The final treatment can also often be successfully applied in a vaporized or gaseous form, i.e. by placing the oxide coated surface in a poorly vented oven containing an appropriate solid or liquid organic and elevating the temperature to the vaporization point of the organic.

Tests have repeatedly shown that water repellency is noticeably greater with the properly applied combination coatings than when the same organic, silicone or fluorocarbon compound is directly applied to the substrate without the metal oxide intermediate layer. Even more dramatic is the effect on bond strength and abrasive rub resistance where coatings without the intermediate metal oxide layer can be removed with very little effort, usually requiring only minimal rubbing with a wet paper towel. In addition, the coating systems of this invention exhibit an interesting self-healing property. For example, if a portion of the organic layer is removed by chemical attack, abrasion or other means, the repellency can often be completely restored by simply reapplying a suitable organic compound to the affected areas.

For reasons stated above, it is believed that the organic, silicone or fluorocarbon coating compound is somehow attached, combined or trapped within the metal oxide layer resulting in the formation of a combination coating system. Since a temperature-time relationship has definitely been found to exist before maximum coating-to-substrate bond strength occurs, it is also believed that a molecular orientation or reorientation occurs between the organic, silicone or fluorocarbon compound and metal oxide and/or hydroxide, perhaps involving the loss of some water of hydration. The self-healing properties of these coatings does not provide supporting evidence that the formation of a metal organic (or silicone or fluorocarbon) chemical compound is involved.

When applying the metal oxide layer to a surface by hand, it has been found that a slowly absorbent type of applicator with a relatively open structure is desirable. The cotton balls or cotton padding previously mentioned are good examples of a preferred material. More dense and highly absorbent materials, such as paper towels, do not work as well in most instances. The slower water absorbing rate of the cotton allows a longer period of application through the critical nearly dry to dry rubbing stage, when oxide bonding to the substrate is occurring. In addition, the open structure of the cotton prevents build up of excess oxide particles that might otherwise cause streaking or even scratching of the substrate.

Mechanized methods for applying the metal oxide coating to a substrate, rather than the hand method described earlier, are of course desirable for production processing. One such method giving excellent results, and presently in use as a prototype application machine, uses motor driven, rotating, hogs hair bristle brushes as the replacement for the cotton applicators mentioned earlier. Again, it has been found essential for optimum oxide bonding to the surface to continue the brush rotation until all the visible water has evaporated from the metal oxide slurry and the surface is clean and dry.

Although not specifically mentioned previously, the order of applying the coating constituents is extremely important. Attempts to apply the organic component to the substrate first, followed by the metal oxide have met with failure. This also shows the importance of having the substrate substantially free of oil, grease and other such contamination before attempting to apply the metal oxide coating constituent.

Properly applied coatings, whether mechanically or hand applied, will be found to be extremely abrasion resistant and hard to remove. For example, the most successful method found so far for removing these coatings from 8"×8" flat plate glass test panels involves the use of a motorized lambs wool pad and −325 mesh calcium carbonate powder made into a medium thick paste with water. The calcium carbonate slurry was applied to the flat surface and rubbed with the rotating pad with considerable pressure until the water repellency was no longer apparent. Even at this point, it was often found that sufficient metal oxide would remain attached to the glass to re-form the repellent surface in the presence of soap and water or other organic compounds.

The coatings according to this invention are normally applied in two steps as described earlier. They can, however, be applied in a single step under proper circumstances and with a special additive to the coating composition. An example would be to use a well blended mixture of a suitable metal oxide precipitate, water, a water insoluble organic such as stearic acid and an inert material such as talc or delaminated kaolin or a suitable suspension agent. Such a mixture will form a stable emulsion with the stearic acid. From careful observation during application, it appears that the water suspended metal oxide first becomes attached to the glass surface during the nearly dry rubbing stage. The stearic acid then appears to become attached to the metal oxide layer during the almost dry to full dry stage. It is reasoned that the highly non-wetting stearic acid has a stronger attraction to the inert platelets of the inert additive than to the glass surface while the water is still present, thereby allowing the metal oxide and stearic acid interactions to occur in proper sequence.

Table II lists some formulations of this single application system which have been successfully used to provide well bonded, water repellent coatings on glass, glazed ceramic insulators and auto paint. The methoxypolyethylene glycol and propylene glycol used in some of these formulations were found to add lubricity for greater ease of application and removal of residual coating material when rubbed to the dry or nearly dry stage. Little difference in coating-to-substrate bond strength (as measured using rub tests) could be detected, however, between similar coatings with or without the glycol additives.

TABLE II

| Selected Single Application Coating Formulations | |
|---|---|
| SAA-4 | 100 g H$_2$O |
| | 10 g Aluminum oxide precipitate (b) |
| | 30 g 325 mesh talc (c) |
| | 4 g Stearic acid (d) |
| SAA-7 | 100 g H$_2$O |
| | 10 g Aluminum oxide precipitate |
| | 30 g 325 mesh talc |
| | 6 g Stearic acid |
| | 0.15 g Methoxypolyethylene glycol (e) |
| SAA-8 | 100 g H$_2$O |
| | 10 g Aluminum oxide precipitate |
| | 30 g 325 mesh talc |
| | 6 g Stearic acid |
| | 0.15 g Methoxypolyethylene glycol |
| | 10 g Propylene glycol (f) |
| SAA-24 | 75 g H$_2$O |
| | 24 g Zirconium oxide precipitate (g) |
| | 15 g Mica powder (h) |
| | 15 g Delaminated kaolin (i) |
| | 6 g Stearic acid |
| | 0.15 g Methoxypolyethylene glycol |
| SAA-30 | 75 g H$_2$O |

TABLE II-continued

Selected Single Application Coating Formulations

| | |
|---|---|
| 24 g | Co-precipitated zirconium and chromium oxides (j) |
| 16 g | Mica powder |
| 15 g | Delaminated kaolin |
| 6 g | Stearic acid |
| 0.15 g | Methoxypolyethylene glycol |

NOTES:
(a) All formulations initially mixed using a high speed blender to form a stable suspension
(b) Fisher Scientific Co., Fair Lawn, New Jersey, A-583, Alumium hydroxide, gelatenous
(c) Cyprus Industrial Minerals Co., Los Angeles, California, Montana talc, BEAVERWHITE 325
(d) Fisher Scientific Co., Fair Lawn, New Jersey, A-292 stearic acid, purified
(e) Union Carbide Corp., New York, New York, 5000 molecular weight
(f) USP grade
(g) Chemically precipitated from a water solution of zirconium oxychloride, $ZrOCl_2.8\ H_2O$ reacted with a slight excess of ammonium hydroxide solution. The precipitate was filtered and washed several times to remove soluble species using filter paper and a vacuum operated Buchner funnel. Used in ther "as filtered" form in the above formulation
(h) Fisher Scientific Co., Fair Lawn, New Jersey, M-231
(i) Georgia Kaolin Co., Elizabeth, New Jersey, KAOPAQUE-20
(j) Same as (g) above, except co-precipitated from a water solution containing 3 parts by wt. of zirconium oxychloride, $ZrOCl_2.8\ H_2O$ and 2.4 parts by wt. of chromium chloride, $CrCl_3.6\ H_2O$.

Flat glass plates have been used as substrates for much of the test data covered in this disclosure. In addition to its availability and low cost, it has been found to be ideally suited for making comparative abrasive rub test measurements between various applied coatings.

A wide variety of types of glass have been evaluated as substrate for these coating systems and have shown excellent water repellency and bonding characteristics. These have included window glass, bottle glass, optical glass, photochromic glass and PYREX. Glass ceramic materials such as CORNINGWARE or PYROCERAM also make excellent substrates.

Other highly suitable substrates include a wide variety of glazed ceramics, high fired ceramics, porcelainized metal, most metals and various painted and enameled surfaces that contain oxides, metal particles and the like. The coating system does not appear to be suitable, and forms negligble if any bond to, highly organic surfaces such as clear plastics, rubber, cloth, wood, etc.

Coated non-porous smooth surfaces such as glass, high fired ceramics, metals and the like, using the methods of this invention will be found to be non-oily after removal of any excess surface organic, silicone or other suitable final treatment. Such surfaces will, however, be found to have a very smooth and slick feel when rubbed with a dry cloth, paper towel or KLEENEX.

One of the primary means of evaluating the metal oxide organic combination coatings covered by this disclosure has been with the use of an electric motor driven abrasive rub-test machine. This machine has been constructed so as to cause a weighted, metal backed, flat velour pad to travel in a reciprocating manner repeatedly over the same area of the flat coated surface being evaluated until a loss of water repellency of the coating is noted. A water calcium carbonate slurry is used as the abrasive media.

More specifically, a 1 3/16"X1 3/16" self adhesive velour pad is attached to a non-rotating, flat metal back-up plate. A constant load of 2.3 lbf is applied to the back-up plate assembly and pad by means of a weight placed on the end of a vertical support rod held in a sleeve bearing of the motorized reciprocating mechanism. Uniform contact pressure between the pad and the coated surface is provided by means of a ball joint between the shaft end and the back-up plate to which the pad is attached. This weighted pad assembly is designed to have a travel of 2½ inches in each direction and the reciprocating motion during testing is maintained at about 100 cycles per minute. The velour pad is manufactured by Kapco for W. T. Rogers Co., Madison, N.J. and is sold under the trade name of SOF-TOUCH.

The abrasive media used during the rub resistance test is a mixture made by thoroughly shaking 100 g of water with 7½ g to 10 g of 2.5 micron mean particle size calcium carbonate sold by Thompson, Weinman and Co. as ATOMITE. About 0.25 g of this slurry is applied by means of an eyedropper to the coated surface just in front of the velour pad assembly prior to starting the machine. The method used to determine the abrasive rub resistance of a coated test sample using this machine has been to count the number of rub cycles required to cause permanent wetting of a very small portion of the coated area being abraded. When used to evaluate the combination coatings, due to their very strong self-healing characteristic, the test is actually a measure of the point at which the metal oxide is sufficiently removed in a small area so that repellency cannot be restored. It is not, necessarily, a measure of the initial removal of the organic, silicone or fluorocarbon coating constituent.

When using flat substrates for the coatings, such as plate glass, the repeatability of tests made in this manner have been found to be remarkably good. The greatest variable has been found to be long term wear of the velour pad and this accounts for some of the variations in rub resistance test results that may be noted when comparing similar coatings from different tables.

Table III shows data obtained from a number of coatings using different highly hydrated metal oxide initial coating treatments. A standardized methanol-stearic acid final coating treatment solution was used in all cases so that the effects caused only by the type of oxide used could be directly compared. The metal oxides found to provide a noticeably high degree of water repellency as well as abrasive rub resistance under these test conditions were those of zirconium, chromium, tin, iron, aluminum and titanium. Note that some of these oxides can be used in more than one oxidation state. Although not listed in Table III, hydrated oxides of nickel, cobalt and cerium have also been evaluated and found to provide highly water repellent surfaces when applied as the initial coating treatment, but failed to provide a particularly high degree of abrasion resistance.

Also included in Table III are a number of highly hydrated complex oxides or mixtures of oxides made by precipitation from water based solutions of the metal salts. These have been found to perform similarly to the single metal salts prepared in a like manner. Other combinations of oxides, selected from those listed in the preceding paragraph and in the Table, would also be likely candidates for highly suitable coating systems according to the method of the invention.

TABLE III

Comparative Abrasive Rub Resistance Tests Using Various Hydrated Metal Oxide Precipitates As Initial Coating Treatment Substrate: 8" × 8" ¼" Plate Glass

| INITIAL COATING TREATMENT | | | FINAL COATING TREATMENT | | | Cure Cycle (b) | Abrasive Rub Resistance Test Results (c) |
|---|---|---|---|---|---|---|---|
| Hydrated Metal Oxide | Formulation | Application Method | Material or Composition (d) | Formulation or Grade | Application Method | | |
| Zirconium (a) | ZC-27-10M5 (f) | Hand Method Using Cotton (n) | 100 g Methanol 1 g Stearic Acid | Commercial (o) Purified (p) | Liquid Wiped on Surface (e) | Room Temperature | 400–450 Rub Cycles |
| Iron (ferrous) (a) | FO-X-10M5 (g) | Hand Method Using Cotton (n) | 100 g Methanol 1 g Stearic Acid | Commercial (o) Purified (p) | Liquid Wiped on Surface (e) | Room Temperature | 100–150 Rub Cycles |
| Iron (ferric) (a) | FI-27-10M5 (h) | Hand Method Using Cotton (n) | 100 g Methanol 1 g Stearic Acid | Commercial (o) Purified (p) | Liquid Wiped on Surface (e) | Room Temperature | 250–300 Rub Cycles |
| Aluminum | AF-27-10M5 (i) | Hand Method Using Cotton (n) | 100 g Methanol 1 g Stearic Acid | Commercial (o) Purified (p) | Liquid Wiped on Surface (e) | Room Temperature | ~30 Rub Cycles |
| Aluminum (a) | AC-25-10M5 (j) | Hand Method Using Cotton (n) | 100 g Methanol 1 g Stearic Acid | Commercial (o) Purified (p) | Liquid Wiped on Surface (e) | Room Temperature | ~350 Rub Cycles |
| Tin (stannous) (a) | SO-X-10M5 (k) | Hand Method Using Cotton (n) | 100 g Methanol 1 g Stearic Acid | Commercial (o) Purified (p) | Liquid Wiped on Surface (e) | Room Temperature | 350–400 Rub Cycles |
| Tin (stannic) (a) | SI-X-10M5 (l) | Hand Method Using Cotton (n) | 100 g Methanol 1 g Stearic Acid | Commercial (o) Purified (p) | Liquid Wiped on Surface (e) | Room Temperature | ~150 Rub Cycles |
| Chromium (a) | CC-20-10M5 (q) | Hand Method Using Cotton (n) | 100 g Methanol 1 g Stearic Acid | Commercial (o) Purified (p) | Liquid Wiped on Surface (e) | Room Temperature | ~450 Rub Cycles |
| Titanium (a) (titanic) | TC-25-10M5 (r) | Hand Method Using Cotton (n) | 100 g Methanol 1 g Stearic Acid | Commercial (o) Purified (p) | Liquid Wiped on Surface (e) | Room Temperature | 75–100 Rub Cycles |
| Ferric (a) Aluminate | AFI-20-10M5 (s) | Hand Method Using Cotton (n) | 100 g Methanol 1 g Stearic Acid | Commercial (o) Purified (p) | Liquid Wiped on Surface (e) | Room Temperature | ~250 Rub Cycles |
| Zirconium (a) Aluminate | ZPA-20-10M5 (m) | Hand Method Using Cotton (n) | 100 g Methanol 1 g Stearic Acid | Commercial (o) Purified (p) | Liquid Wiped on Surface (e) | Room Temperature | ~300 Rub Cycles |
| Zinc Stannate (a) | ZNS-20-10M5 (t) | Hand Method Using Cotton (n) | 100 g Methanol 1 g Stearic Acid | Commercial (o) Purified (p) | Liquid Wiped on Surface (e) | Room Temperature | ~125 Rub Cycles |
| Zirconium and Stannous oxides, co-precipitated (a) | ZPSO-20-10M5 (u) | Hand Method Using Cotton (n) | 100 g Methanol 1 g Stearic Acid | Commercial (o) Purified (p) | Liquid Wiped on Surface (e) | Room Temperature | ~125 Rub Cycles |
| Zirconium and Aluminum oxides, co-precipitated (a) | ZPA-20-10M5 (v) | Hand Method Using Cotton (n) | 100 g Methanol 1 g Stearic Acid | Commercial (o) Purified (p) | Liquid Wiped on Surface (e) | Room Temperature | ~300~ Rub Cycles |
| Ferric and Chromium oxides, co-precipitated (a) | CPF-25-10M5 (w) | Hand Method Using Cotton (n) | 100 g Methanol 1 g Stearic Acid | Commercial (o) Purified (p) | Liquid Wiped on Surface (e) | Room Temperature | ~350~ Rub Cycles |
| Zirconium and Chromium oxides, | CPZ-25-10M5 (u) | Hand Method Using Cotton (n) | 100 g Methanol 1 g Stearic Acid | Commercial (o) Purified (p) | Liquid Wiped on Temper- | Room | ~450~ Rub Cycles |

TABLE III-continued

Comparative Abrasive Rub Resistance Tests Using Various Hydrated Metal Oxide Precipitates As Initial Coating Treatment Substrate: 8" × 8" 1/4" Plate Glass

| INITIAL COATING TREATMENT | | | FINAL COATING TREATMENT | | | Cure | Abrasive Rub |
|---|---|---|---|---|---|---|---|
| Hydrated Metal Oxide | Formulation | Application Method | Material or Composition (d) | Formulation or Grade | Application Method | Cycle (b) | Resistance Test Results (c) |
| co-precipitated (a) | | | | | Surface (e) | ature | |

NOTES:
(a) Chemically precipitated from water solution of specified metal salt reacted with slight excess of ammonium hydroxide solution. The precipitate was filtered and washed several times to remove soluble species using filter paper and a vacuum operated Buchner funnel.
(b) Average temperature 65–68 F. during test period.
(c) Made using rub test machine and exact method outlined in text of "Description of the Invention" with 0.75 g of $CaCO_3$ ATOMITE powder mixed with 100 g $H_2O$ used as the abrasive media.
(d) Proportions for mixing final coating treatment solutions are indicated by weight when more than one material is involved. Solids were thoroughly dissolved in solvents before use.
(e) Applicatin made by lightly rubbing the metal oxide coated surface using a cotton ball previously dipped in the specified solution. The surface was kept coated with a solution in this manner for a period of 1 1/2 to 2 minutes before allowing to air dry at room temperature for 20 to 30 minutes. Non reacted residue then removed from surface by washing with IVORY soap and warm water. Repellency and abrasive rub resistance tests made within 1 to 4 hours of final coating treatment.
(f) Filtered precipitate prepared from zirconium oxychloride, $ZrOCl_2.8\ H_2O$, per note (a) and made into a relatively thick just barely flowable suspension by adding 23 g of additional water to 27 g of the oxide precipitate from the initial vacuum filtering and washing operation using a high speed blender. The 23 g of added water also contains 5000 molecular weight methoxypolyethylene glycol, manufactured by Union Carbide Corporation, in an amount of 0.25 g per 100 g of $H_2O$.
(g) Same as note (f) except prepared from ferrous chloride, $FeCl_2.4\ H_2O$. The exact amount of added water (containing the glycol additive) was not measured but the oxide suspension was adjusted to an equivalent consistency to that of Test 1.
(h) Same as note (f) except prepared from ferric nitrate, $Fe(NO_3)_2.9\ H_2O$.
(i) Same as note (f) except precipitate purchased in ready to use form as aluminum hydroxide gel, $Al(OH)_3.nH_2O$ Fisher Scientific Company as their #A-583.
(j) Same as note (f) except prepared from aluminum chloride, $AlCl_3.6\ H_2O$ and 25 grams of additional water-glycol mixture added to 25 grams of the oxide precipitate.
(k) Same as note (g) except prepared from stannous chloride, $SnCl_2.2\ H_2O$.
(l) Same as note (g) except prepared from stannic chloride, $SnCl_2.5\ H_2O$.
(m) Chemically precipitated by mixing water solutions of zirconium oxychloride, $ZrOCl_2.8\ H_2O$ and sodium aluminate, $NaAl_2O_3.3\ H_2O$. The precipitate was filtered and washed several times to remove excess basicity from soluble species using filter paper and a vacuum operated Buchner funnel. See note (f) above for water-glycol addition except that 30 grams of additional water-glycol mixture is used with 20 grams of the filtered oxide precipitate.
(n) About 2 g of the specified oxide suspension is applied to the previously cleaned 8" × 8" plate glass panel and rubbed onto the surface by hand using 2 standard size (1" dia.) sterile cotton balls. Rubbing is continued using moderate pressure and as uniform a coverage as possible until all visible water and oxide has left the surface and it has reached a dry to nearly stage.
(o) Commercial grade mathanol, ZERACOL, manufactured by Zehrung Chemical Co., Portland, Oregon.
(p) Stearic Acid, purified, Fisher Scientific Co., A-292.
(q) Same as note (f) above except prepared from chromium chloride, $CrCl_2.6\ H_2O$ and 30 g of additional glycol containing water added to 20 g of the oxide precipitate.
(r) Same as note (j) except prepared from titanium tetrachloride, 20% solution, technical grade.
(s) Same as note (m) except prepared from Ferric Chloride, $FeCl_2.4\ H_2O$ and sodium aluminate, $NaOAl_2O_3.3\ H_2O$.
(t) Same as note (m) except prepared from zinc nitrate, $Zn(NO_3)_2.6\ H_2O$ and potassium stannate, $K_2SnO_3.xH_2O$.
(u) Chemically co-precipitated by making a water solution of 3 parts by wt. of zirconium oxychloride, $ZrOCl_2.8\ H_2O$ and 1.7 parts by wt. of stannous chloride, $SnCl_2.2\ H_2O$ and reacting with slight excess of ammonium hydroxide solution. See note (f) for water-glycol addition except that 30 grams of additional water-glycol mixture is used with 20 g of the filtered oxide co-precipitate.
(v) Same as note (u) above except co-precipitated from solution containing 3 parts by wt. of zirconium oxychloride, $ZrOCl_2.8\ H_2O$ and 2.2 parts by wt. of alumium chloride, $AlCl_3.6\ H_2O$.
(w) Same as note (u) above except co-precipitated from solution containing 3 parts by wt. of chromium chloride, $CrOCl_2.6\ H_2O$ and 2.3 parts by wt. of ferric chloride, $FeCl_3.6\ H_2O$ and 25 grams of additional water-glycol mixture used with 25 g of the filtered oxide co-precipitate.
(x) Same as note (u) except co-precipitated from solution container 3 parts by wt. of zirconium oxychloride, $ZrOCl_2.8\ H_2O$ and 2.4 parts by wt. of chromium chloride, $CrCl_3.6\ H_2O$ and 25 grams of additional water-glycol mixture and 25 g of the filtered oxide co-precipitate.

TABLE III-A

EFFECT OF COATING ABRASIVE RUB RESISTANCE BY DILUTING THE INITIAL COATING TREATMENT OF ZIRCONIUM OXIDE PRECIPITATE WITH ADDITIONAL WATER

Substrate: 8" × 8" 1/4" Plate Glass

| Test | INITIAL COATING TREATMENT | | | | | FINAL COATING TREATMENT | | Cure Cycle (b) | Abrasive Rub Resistance Test Results (c) |
|---|---|---|---|---|---|---|---|---|---|
| | Hydrated Metal Oxide | Formulation | Oxide Precipitate:Added $H_2O$ Parts by Weight | Lubricant (o) | Application Method | Material Composition and Grade (d) | Application Method | | |
| 1 | Zirconium (a) | ZC (f) | no added water | not used | hand method using cotton (n) | 100 g methanol commercial (l) 1 g stearic acid purified (m) | liquid wiped on surface (e) | Room Temperature | 250–300 Rub Cycles |
| 2 | Zirconium (a) | ZC-30 (p) | 30:20 | not used | hand method using cotton (n) | 100 g methanol commercial (l) 1 g stearic acid purified (m) | liquid wiped on surface (e) | Room Temperature | 300–350 Rub Cycles |
| 3 | Zirconium (a) | ZC-25 (g) | 25:25 | not used | hand method using cotton (n) | 100 g methanol commercial (l) 1 g stearic acid purified (m) | liquid wiped on surface (e) | Room Temperature | 300–350 Rub Cycles |
| 4 | Zirconium (a) | ZC-25-10M5 (h) | 25:25 | used | hand method using cotton (n) | 100 g methanol commercial (l) 1 g stearic acid purified (m) | liquid wiped on surface (e) | Room Temperature | ~350 Rub Cycles |
| 5 | Zirconium (a) | ZC-25-10M5 (i) | 20:30 | used | hand method using cotton (n) | 100 g methanol commercial (l) 1 g stearic acid purified (m) | liquid wiped on surface (e) | Room Temperature | ~175 Rub Cycles |
| 6 | Zirconium (a) | ZC-25-10M5 (j) | 15:35 | used | hand method using cotton (n) | 100 g methanol commercial (l) 1 g stearic acid purified (m) | liquid wiped on surface (e) | Room Temperature | ~50 Rub Cycles |
| 7 | Zirconium | ZC-25-10M5 | 10:40 | used | hand method | 100 g methanol | liquid | Room | ~30 |

TABLE III-A-continued

EFFECT OF COATING ABRASIVE RUB RESISTANCE BY DILUTING THE INITIAL
COATING TREATMENT OF ZIRCONIUM OXIDE PRECIPITATE WITH ADDITIONAL WATER

Substrate: 8" × 8" ¼" Plate Glass

| Test | INITIAL COATING TREATMENT ||||| FINAL COATING TREATMENT || Cure Cycle (b) | Abrasive Rub Resistance Test Results (c) |
|---|---|---|---|---|---|---|---|---|
| | Hydrated Metal Oxide | Formulation | Oxide Precipitate:Added $H_2O$ Parts by Weight | Lubricant (o) | Application Method | Material Composition and Grade (d) | Application Method | | |
| | (a) | (k) | | | using cotton (n) | commercial (l) 1 g stearic acid purified (m) | wiped on surface (e) | Temperature | Rub Cycles |

(a) See TABLE III note (a)
(b) See TABLE III note (b)
(c) See TABLE III note (c)
(d) See TABLE III note (d)
(e) See TABLE III note (e)
(f) The filtered precipitate was prepared from zirconium oxychloride, $ZrOCL_2 \cdot 8\ H_2O$, per note (a). The initial coating treatment for Test 1 was made using the "as filtered" material with no additional water added. Note that the filtered precipitate prepared for use in the tests of this was found to contain only 7% of solid residue when a sample was heated at 250° for four hours.
(g) 25 g of the zirconium oxide precipitate described in notes (a) and (f) were added to 25 g of additional water and thoroughly mixed using a high speed blender.
(h) 25 g of the zirconium oxide precipitate described in notes (a) and (f) were added to 25 g of additional water and thoroughly mixed using a high speed blender. The added water also contained 5000 molecular weight methoxypolyethylene glycol, manufactured by Union Carbide Corporation, in an amount of 0.25 g per 100 g of $H_2O$.
(i) Same as note (h) except 20 g of zirconium oxide precipitate blended with 30 g of $H_2O$ containing the glycol additive.
(j) Same as note (h) except 15 g of zirconium oxide precipitate blended with 35 g of $H_2O$ containing the glycol additive.
(k) Same as note (h) except 10 g of zirconium oxide precipitate blended with 40 g of $H_2O$ containing the glycol additive.
(l) See TABLE III note (o)
(m) See TABLE III note (p)
(n) See TABLE III note (n)
(o) Methoxypolyethylene glycol 5000 molecular weight, added to zirconium oxide initial treatment when specified in table. Acts as lubricant to provide a more uniform and more easily applied coating. See notes (h), (i), (j) and (k) to determine specific acounts of lubricant used in a particular test.
(p) Same as note g except 30 g of zirconium oxide precipitated blended with 20 g $H_2O$ Among the various single oxides evaluated and found to be suitable, the hydrated zirconium oxide would be selected as having the most preferred qualities on an overall basis. It is extremely easy to prepare in a washed and filtered form; it can be applied in a wide range of water oxide concentrations without danger of excess oxide build-up on the surface being coated; it provides one of the highest coating-to-substrate bond strengths; it is highly water repellent; it is not affected by alkalies; it is relatively low in cost; and, is relatively low in toxicity. The hydrated chromium oxide has excellent abrasion resistance characteristics but is difficult to apply to a surface without obtaining streaking due to an oxide build-up. Among the oxide combinations evaluated to date, the hydrated zirconium-chromium mixtures are probably most interesting. An approximately 50-50 combination, for example, effectively solves the oxide surface build-up problem and slightly improves overall rub-resistance over that of the zirconium oxide alone.

Each test was made using a well cleaned 8"×8"×¼" plate glass test panel. The particular oxide, complex oxide or co-precipitated oxide mixture was applied to one of the 8"×8" surfaces using the cotton ball method previously mentioned. In this substance, about 2 g of the oxide suspension was rubbed onto the surface using a moderate amount of pressure and continued, using as uniform a motion and surface coverage as possible, until all visible water and oxide had left and a nearly dry, to dry surface had been reached.

The organic compound final treatment was next applied to the test surface within a half hour or less following the application of the metal oxide layer. The organic used in all the tests of Table III consisted of 1 g stearic acid thoroughly dissolved in 100 g of methanol. Application was made by lightly rubbing the test panel surface with a cotton ball previously dipped in the methanol-stearic acid solution just described and keeping the surface wet for about 1½ to 2 minutes. At this point the plates were allowed to air dry at room temperature for about 20-30 minutes. The methanol rapidly evaporates, but a thin residual coating remains on the glass caused by the stearic acid constituent which is then removed by washing with soap and water. The panels were then tested for abrasive rub resistance, which was completed within two hours or less from the time that the organic final treatment was originally applied. Additional formulation and testing details are covered in the Table notes.

Table III-A shows abrasive rub resistance variations obtained from coatings using a highly hydrated zirconium oxide precipitate as the initial coating treatment. Variations have been made in the amount of additional water that has been included with the vacuum filtered oxide precipitate.

Test 1 shows the use of the vacuum filtered precipitate applied to glass test surfaces with no additional water included. Tests 2 through 7 were made using the same filtered precipitate but with additional water, in varying amounts, thoroughly mixed by means of a high speed blender. Application of the filtered precipitate alone or water diluted slurries thereof to the glass test panels were made by rubbing by hand using two cotton balls until the surface reached a nearly dry to dry stage. The exact application method is explained more fully in the Table notes. The final coating treatment was the same as ussed in the preceding Table consisting of a dissolved solution of stearic acid in methanol. This final treatment was applied by keeping the surface coated with the organic mixture for two minutes and then allowing the plates to air dry for 20-30 minutes before removing excess stearic acid residue with a soap and water washing. The panels were evaluated for abrasive rub resistance after three to four hours from the time of coating application.

It should be pointed out that the filtered oxide precipitate inherently contains a large percentage of water, intimately associated with the oxide that is not removed during the vacuum filtering process. This filtered material, when removed from the Buchner funnel, has a coarse, non-flowable, mushy consistency. A sample of the identical filtered preciptitate as used in Test 1 (or in the other tests after blending with additional water), was found to contain only 7% solids by weight after heating at 250° F. for four hours in an oven. This indicates a very high water content of about 93% by weight despite its appearance of containing much more solid material.

The initial treatment used in Test 1, consisting of the filtered precipitate without added water, could be applied with only minor difficulty once it became embedded in the cotton applicator. The solutions used in Tests 2 through 7 were much easier to apply due to the added water. For example, the solutions used in Tests 3 and 4, containing 1 part by weight of filtered precipitate to 1 part by weight of additional water, makes a just barely flowable suspension found to be very easy to apply to the test surface. A would be expected, the oxide solutions used in Tests 5, 6 and 7 form progressively thinner suspensions with the increase in the amount of added water. These are also easy to apply to the substrate.

All of the coatings shown in Test III-A were found to have a very high degree of water repellency with no observable differences in this respect as a result of variations in the initial oxide coating treatment. All coatings were found to be optically clear with no streaking or other imperfections. However, definite differences were found in the abrasive rub resistance tests as a result of the amount of added water used in the initial oxide treatment.

Tests 1, 2 and 3 show a minor increase in resistance to abrasion is effected through the use of additional water added to the filtered precipitate, up to at least 1:1 parts by weight. Using even more water added to the filtered precipitate causes a decrease in the abrasive rub resistance.

It will be noted that some of the initial coating treatments shown in Table III-A contain an added lubricant. In the instance, the lubricant consists of a small amount of 5000 molecular weight methoxypolyethylene glycol. As mentioned earlier in the application, this additive has only a minor effect on abrasive rub resistance and water repellency results as can be seen in part from an examination of Tests 3 and 4. However, the added glycol lubricant does provide noticeably less drag during the nearly dry to dry application step and enhances the uniformity of application to the surface being coated in comparison to slurries without the lubricant. The selection of 5000 molecular weight methoxypolyethylene glycol in this instance was not critical and a wide variety of polyethylene and methoxy polyethylene glycols with molecular weights ranging from 2000 to 20,000 have been used with equally effective results. The addition of the glycol additive has also been found to aid in keeping the oxide slurry in suspension. Only very small amounts of the lubricant are required to accomplish these purposes.

Table IV shows comparative tests of a large number of combination coatings in which different organic, silicone and fluorocarbon compound final treatments have been applied to an initial zirconium oxide treatment. Again, these coatings have been applied to 8"×8" flat plate glass test panels for the purpose of determining relative abrasive rub resistance data. It will be noted that the final treatments used in this test series include both individual compounds or combinations of materials and that these have been selected from those listed earlier in Table I.

TABLE IV

Comparative Abrasive Rub Resistance Tests Using A Variety Of Final Treatment Materials or Mixtures Applied To The Metal Oxide Initial Treatment Layer Substrate: 8" × 8" ¼" Plate Glass

| | INITIAL COATING TREATMENT | | | FINAL COATING TREATMENT | | | Cure | Abrasive Rub |
|---|---|---|---|---|---|---|---|---|
| Test | Hydrated Metal Oxide | Formulation | Application Method | Material or Composition (p) | Formulation or Grade | Application Method | Cycle (b) | Resistance Test Results (c) |
| 1 | Zirconium (a) | ZC-24-12M5 (f) | Hand Method Using Cotton (d) | 1-Propanol | technical | Liquid Wiped On Surface (e) | 250 F. - 45 min. | ~100 Rub Cycles |
| 2 | Zirconium (a) | ZC-24-12M5 (f) | Hand Method Using Cotton (d) | Isopropanol | technical | Liquid Wiped On Surface (e) | 250 F. - 45 min. | ~150 Rub Cycles |
| 3 | Zirconium (a) | ZC-24-12M5 (f) | Hand Method Using Cotton (d) | Methanol | certified A.C.S. | Liquid Wiped On Surface (e) | 250 F. - 45 min. | ~225 Rub Cycles |
| 4 | Zirconium (a) | ZC-24-12M5 (f) | Hand Method Using Cotton (d) | Methanol | commercial (n) | Liquid Wiped On Surface (e) | 250 F. - 45 min. | 220-225 Rub Cycles |
| 5 | Zirconium (a) | ZC-24-12M5 (f) | Hand Method Using Cotton (d) | Acetone | certified A.C.S. | Liquid Wiped On Surface (e) | 250 F. - 45 min. | ~225 Rub Cycles |
| 6 | Zirconium (a) | ZC-24-12M5 (f) | Hand Method Using Cotton (d) | Methyl ethyl keytone | certified A.C.S. | Liquid Wiped On Surface (e) | 250 F. - 45 min. | 200-225 Rub Cycles |
| 7 | Zirconium (a) | ZC-24-12M5 (f) | Hand Method Using Cotton (d) | Carbon Tetrachloride | spectrographic | Liquid Wiped On Surface (e) | 250 F. - 45 min. | ~150 Rub Cycles |
| 8 | Zirconium (a) | ZC-24-12M5 (f) | Hand Method Using Cotton (d) | 1,1,1-trichloroethane | certified A.C.S. and inhibited | Liquid Wiped On Surface (e) | 250 F. - 45 min. | 200-250 Rub Cycles |
| 9 | Zirconium (a) | ZC-24-12M5 (f) | Hand Method Using Cotton (d) | 1,1,1-trichloroethane | household (o) | Liquid Wiped On Surface (e) | 250 F. - 45 min. | 200-250 Rub Cycles |
| 10 | Zirconium (a) | ZC-24-4C6 (g) | Hand Method Using Cotton (d) | Linolenic Acid | purified (s) | Liquid Wiped On Surface (e) | 250 F. - 45 min. | ~125 Rub Cycles |
| 11 | Zirconium (a) | ZC-24-4C6 (g) | Hand Method Using Cotton (d) | Oleic Acid | purified (s) | Liquid Wiped On Surface (e) | 250 F. - 45 min. | 125-150 Rub Cycles |
| 12 | Zirconium (a) | ZC-24-4C6 (g) | Hand Method | n-Hexadecane | 99% (r) | Liquid | 250 F. - | ~100 |

TABLE IV-continued
Comparative Abrasive Rub Resistance Tests Using A Variety Of Final Treatment Materials or Mixtures Applied To The Metal Oxide Initial Treatment Layer Substrate: 8" × 8" ¼" Plate Glass

| Test | INITIAL COATING TREATMENT | | | FINAL COATING TREATMENT | | | Cure Cycle (b) | Abrasive Rub Resistance Test Results (c) |
|---|---|---|---|---|---|---|---|---|
| | Hydrated Metal Oxide | Formulation | Application Method | Material or Composition (p) | Formulation or Grade | Application Method | | |
| 13 | Zirconium (a) | ZC-24-4C6 (g) | Hand Method Using Cotton (d) | Mineral Oil | commercial | Liquid Wiped On Surface (e) | 250 F. - 45 min. | ~75 Rub Cycles |
| 14 | Zirconium (a) | ZC-24-4C6 (g) | Hand Method Using Cotton (d) | Mineral Spirits | commercial | Liquid Wiped On Surface (e) | 250 F. - 45 min. | ~75 Rub Cycles |
| 15 | Zirconium (a) | ZC-24-4M5 (h) | Hand Method Using Cotton (d) | 100 g 1-Propanol 1 g Stearic Acid | technical, purified (q) | Liquid Wiped On Surface (e) | 250 F. - 45 min. | ~250 Rub Cycles |
| 16 | Zirconium (a) | ZC-24-4M5 (h) | Hand Method Using Cotton (d) | 100 g Isopropanol 1 g Stearic Acid | technical, (g) purified | Liquid Wiped On Surface (e) | 250 F. - 45 min. | ~250 Rub Cycles |
| 17 | Zirconium (a) | ZC-24-4M5 (h) | Hand Method Using Cotton (d) | 100 g Methanol 1 g Stearic Acid | commercial (n) purified (q) | Liquid Wiped On Surface (e) | 250 F. - 45 min. | 250-300 Rub Cycles |
| 18 | Zirconium (a) | ZC-24-4M5 (h) | Hand Method Using Cotton (d) | 100 g Acetone 1 g Stearic Acid | certified ACS purified (q) | Liquid Wiped On Surface (e) | 250 F. - 45 min. | 150-200 Rub Cycles |
| 19 | Zirconium (a) | ZC-24-4M5 (h) | Hand Method Using Cotton (d) | 100 g 1,1,1 Trichloroethene 1 g Stearic Acid | certified ACS purified (q) | Liquid Wiped On Surface (e) | 250 F. - 45 min. | ~225 Rub Cycles |
| 20 | Zirconium (a) | ZC-24-4M5 (h) | Hand Method Using Cotton (d) | 100 g 1,1,1 Trichloroethene 1 g Paraffin | certified ACS purified (q) | Liquid Wiped On Surface (e) | 250 F. - 45 min. | ~200 Rub Cycles |
| 21 | Zirconium (a) | ZC-24-4M5 (h) | Hand Method Using Cotton (d) | 100 g Methanol 0.4 g Ammonium Stearate | commercial (n) purified | Liquid Wiped On Surface (e) | 250 F. - 45 min. | ~200 Rub Cycles |
| 22 | Zirconium (a) | ZC-24-4M5 (h) | Hand Method Using Cotton (d) | 100 g Methanol 0.4 g Sodium Stearate | commercial (n) purified | Liquid Wiped On Surface (e) | 250 F. - 45 min. | ~150 Rub Cycles |
| 23 | Zirconium (a) | ZC-24-4PEGC20 (i) | Hand Method Using Cotton (d) | 25 g Acetone 75 g Methanol | certified ACS certified ACS | Liquid Wiped On Surface (e) | 250 F. - 45 min. | ~250 Rub Cycles |
| 24 | Zirconium (a) | ZC-24-4PEGC20 (i) | Hand Method Using Cotton (d) | Stoddard Solvent | (t) | Liquid Wiped On Surface (e) | 250 F. - 45 min. | 100-125 Rub Cycles |
| 25 | Zirconium (a) | ZC-24-4M5 (h) | Hand Method Using Cotton (d) | 30 g Propylene Glycol 20 g 1-Propanol 0.25 g Stearic Acid | USP, technical purified (q) | Liquid Wiped On Surface (e) | 250 F. - 45 min. | ~300 Rub Cycles |
| 26 | Zirconium (a) | ZC-24-4M5 (h) | Hand Method Using Cotton (d) | 30 g Propylene Glycol 20 g Methanol 0.25 g Stearic Acid | USP, commercial (n) purified (q) | Liquid Wiped On Surface (e) | 250 F. - 45 min. | ~300 Rub Cycles |
| 27 | Zirconium (a) | ZC-24-4M5 (h) | Hand Method Using Cotton (d) | 30 g Propylene Glycol 20 g Methanol | USP, certified ACS | Liquid Wiped On Surface (e) | 250 F. - 45 min. | ~200 Rub Cycles |
| 28 | Zirconium (a) | ZC-24-4M5 (h) | Hand Method Using Cotton (d) | 30 g Propylene Glycol 20 g Methanol 0.25 g Ammonium Stearate | USP, commercial (n) purified (q) | Liquid Wiped On Surface (e) | 250 F. - 45 min. | ~225 Rub Cycles |
| 29 | Zirconium (a) | ZC-24-4M5 (h) | Hand Method Using Cotton (d) | 30 g Propylene Glycol 20 g Methanol 0.25 g Myristic Acid | USP, commercial (n) 95% (r) | Liquid Wiped On Surface (e) | 250 F. - 45 min. | ~275 Rub Cycles |
| 30 | Zirconium (a) | ZC-24-4PEGC20 (i) | Hand Method Using Cotton (d) | 100 g Methyl Ethyl Keytone 1 g Dimethyl-Silicone (1000 centistoke) | certified ACS technical (j) | Liquid Wiped On Surface (e) | 250 F. - 45 min. | ~300 Rub Cycles |
| 31 | Zirconium (a) | ZC-24-4PEGC20 (i) | Hand Method Using Cotton (d) | 100 g Methyl Ethyl Keytone 1 g Dimethyl-Silicone (500 centistoke) | certified ACS technical (j) | Liquid Wiped On Surface (e) | 250 F. - 45 min. | ~250 Rub Cycles |
| 32 | Zirconium (a) | ZC-24-4PEGC20 (i) | Hand Method Using Cotton (d) | 100 g 1,1,1 Trichloroethane 1 g Dimethyl-Silicone (1000 centistoke) | certified technical (j) | Liquid Wiped On Surface (e) | 250 F. - 45 min. | ~125 Rub Cycles |
| 33 | Zirconium (a) | ZC-24-4PEGC20 (i) | Hand Method Using | Dimethylsilicone (1000 centistoke) | technical (l) | Liquid Wiped On | 250 F. - 45 min. | ~125 Rub Cycles |

TABLE IV-continued

Comparative Abrasive Rub Resistance Tests Using A Variety Of
Final Treatment Materials or Mixtures Applied To The Metal Oxide Initial Treatment Layer Substrate: 8" × 8" ¼" Plate Glass

| | INITIAL COATING TREATMENT | | | FINAL COATING TREATMENT | | | Cure Cycle (b) | Abrasive Rub Resistance Test Results (c) |
|---|---|---|---|---|---|---|---|---|
| Test | Hydrated Metal Oxide | Formulation | Application Method | Material or Composition (p) | Formulation or Grade | Application Method | | |
| 34 | Zirconium (a) | ZC-24-4PEGC20 (i) | Hand Method Using Cotton (d) | Fluorosilcone (1000 centistoke) | technical (l) | Liquid Wiped On Surface (e) | 250 F. - 45 min. | ~125 Rub Cycles |
| 35 | Zirconium (a) | ZC-24-4PEGC20 (i) | Hand Method Using Cotton (d) | Fluorocarbon oil | industrial (mm | Liquid Wiped On Surface (e) | 250 F. - 45 min. | ~75 Rub Cycles |
| 36 | Zirconium (a) | ZC-25 (u) | Hand Method Using Cotton (d) | 1 g hydroxy terminated (SiOH) dimethyl reactive silicone fluid 100 methyl ethyl ketone | technical (v) certified ACS | Liquid Wiped On Surface (e) | 250 F. - 45 min. | ~200 Rub Cycles |
| 37 | Zirconium (a) | ZC-25 (u) | Hand Method Using Cotton (d) | 1 g hydroxy terminated (SiOH) dimethyl reactive silicone fluid | technical (v) certified ACS | Liquid Wiped On Surface (e) | 250 F. - 45 min. | ~175-200 Rub Cycles |

NOTES:
(a) See TABLE III, note (a).
(b) Cure temperature nominal value indicated with variations of ±50 F. cure time as indicated ±15 minutes.
(c) See TABLE III, note (c).
(d) See TABLE III, note (d).
(e) Application made by lightly rubbing the metal oxide coated surface using a cotton ball previously dipped in the specified solution. The test plate was then placed in a temperature controlled oven for the indicated temperature and time and then cooled to room temperature. The plate was then washed with IVORY soap to remove any excess non-reacted surface materials and tested for abrasive rub resistance and repellency comparisons within 1-4 hours of applying the final coating treatment.
(f) Filtered precipitate prepared from zirconium oxychloride, $ZrCl_2 \cdot 8\ H_2O$ per note (a) and made into a relatively thick, just barely flowable suspension by mixing 24 g of water containing oxide precipitate from the vacuum filtering and washing operation with 26 g additional water using a high speed blender. The 26 g of additional water also contained 5000 molecular weight methoxypolyethylene glycol, manufactured by Union Carbide Corporation, in an amount of 0.3 g per 100 g of $H_2O$.
(g) Same as note (f) above except 0.1 g of 6000 molecular weight polyethylene glycol, manufactured by Union Carbide Company substituted for the methoxypolyethylene glycol per 100 g of $H_2O$.
(h) Same as note (f) above except only 0.1 g methoxypolyethylene glycol added per 100 g of $H_2O$.
(i) Same as note (f) above except 0.11 g of polyethylene glycol compound 20K manufactured by Union Carbide Corporation, molecular weight 15000-18000, substituted for the methoxypolyethylene glycol per 100 g of $H_2O$.
(j) General Electric Co., SF-96, 1000 centistoke fluid.
(k) General Electric Co., SF-96, 500 centistoke fluid.
(l) Dow Chemical Co., FS-2165, 1000 centistoke fluid.
(m) Hooker Chemical Corporation., FLUOROLUBE LG-160-fluid.
(n) Commercial grade methanol, ZERACOL, manufactured by Zehrang Chemical Co., Portland, Oregan.
(o) Household fabric spot remover containing 1,1,1,-trichloroethane sold as ENERGINE, the d-Con Company Inc., subsidiary of Sterling Drug Inc.
(p) See TABLE III, note (d).
(q) See TABLE III, note (p).
(r) Aldrich Chemical Co.
(s) Fisher Scientific Co. A-222
(t) Fisher Scientific Co. S-457.
(u) See TABLE IIIA note (g).
(v) Union Carbide Corp. dimethyl silicone reactive fluid type L-9000 1000 centistoke grade An elevated cure temperature has been used in the tests of Table IV following the application of the final coating treatment. This consisted of placing the test plates in an oven and elevating the temperature to about 250° F. for about 45 minutes. The plates were then cooled to room temperature prior to a final soap and water washing before making the rub test measurements. As can be seen in Table IV, a large number of diverse final treatments can be used that provide very tough coatings. All of these coatings were found to be extremely water repellent.

Table V covers water repellency and rub-resistance tests made in order to compare the metal oxide organic combination coating system with other types of coatings. Tests 1 and 2 show coatings of the type covered by this invention using organic or silicone final treatments, respectively, applied over zirconium oxide initial treatments.

TABLE V

Comparative Abrasive Rub Resistance and Repellency Tests Between Composite Coating of the Invention and Other Coating Systems Substrate: 8" × 8" ¼" Plate Glass

| Test | Coating System | Cure Cycle (a) | Water Repellency (b) | Abrasive Rub Resistance Test Results (c) |
|---|---|---|---|---|
| 1 | Zirconium oxide/methanol-stearic acid combination coating - See TABLE VII test 5 | Room Temperature | excellent | ~250 Rub Cycles |
| 2 | Zirconium oxide/methyl ethyl keytone-dimethylsilicone (1000 centistoke) coating - See TABLE VI, test 9 | Room Temperature | excellent | 250-300 Rub Cycles |
| 3 | Stearic Acid-methanol mixture applied directly to clean glass surface (no metal oxide) (d) | Room Temperature | poor | ~1 Rub Cycles |
| 4 | Dimethylsilcone-methyl ethyl keytone mixture applied directly to clean glass surface (no metal oxide) (e) | Room Temperature | good | ~5 Rub Cycles |
| 5 | Zirconium oxide coating only - no final treatment (f) | Room Temperature | none | 0 Rub Cycles |
| 6 | Zirconium oxide coating only - no final treatment (f) | 250 F. - 455 min. | good | ~15 Rub Cycles |
| 7 | CAR PLATE, commercial auto finish (g) | Room Temperature | good | ~5 Rub Cycles |
| 8 | DESICOTE, organo/silicone water repellent coating | Room Temperature | good | ~10 Rub Cycles |

TABLE V-continued

Comparative Abrasive Rub Resistance and Repellency Tests Between Composite Coating of the Invention and Other Coating Systems Substrate: 8" × 8" ¼" Plate Glass

| Test | Coating System | Cure Cycle (a) | Water Repellency (b) | Abrasive Rub Resistance Test Results (c) |
|---|---|---|---|---|
| | sold for treating laboratory glassware, etc. (h) | | | |
| 9 | SILANE, 8-5479 - chemical monomer that forms a water repellent surface on glass surfaces (i) | Room Temperature | good | ~50 Rub Cycles |

NOTES:
(a) Room temperature tests made at 65–68 F. Elevated temperature cure cycles made at nominal temperature indicated with ±50 F. variations during the 45 minute ± 15 minute cycle.
(b) Made by visually observing water beading on surface of treated plate.
(c) See TABLE III, note (c)
(d) Stearic acid, Fisher Scientific Co., A-292 purified, 1 g, dissolved in 50 g isopropanol, technical grade.
(e) Dimethylsilicone, General Electric Co. SF-96, 1000 centistoke, 1 g, disssolved in 50 G methyl ethyl keytone, certified, A.C.S.
(f) Zirconium oxide suspension, type ZC-27-10M5. See TABLE III, notes (a) and (f).
(g) S. C. Johnson and Son, Inc.
(h) Beckman Instruments, Inc., Part #18772.
(i) Dow Corning Corporation, 8-5479 Silane.

Tests 3 and 4 show the same final treatment materials used in Tests 1 and 2 but applied directly to the glass test surface without the intermediate zirconium oxide treatment. A comparison of the water repellency, and especially the abrasive rub resistance data, will indicate the importance of the metal oxide component of this combination coating system.

Test 5 shows results obtained from a zirconium oxide treated panel that was given no organic, silicone or fluorocarbon final treatment. As would be expected, no repellency was found to be present; however, the same panel was subsequently placed in an oven and heated to 250° F. for about 45 minutes, cooled to room temperature and then tested. This is shown as Test 6 in Table V and a minor degree of repellency and abrasive rub resistance was found. Oven curing could certainly have removed some waters of hydration from the zirconium oxide layer but it is more likely, based on several related tests, that the existing repellency was due to exposure of the sample to small amounts of vaporized organic materials present in the oven during the elevated temperature cycle.

Test 7 shows the properties found after treating a glass surface with a commercial auto polish and allowing 48 hours for curing at room temperature before testing. Again, very minimal rub resistance was found. An organic silicone water repellent coating sold for protecting laboratory glassware was applied according to the manufacturer's directions and comparative results are shown in Test 8. Test 9 shows a silane monomer, also designed to provide water repellency to glass, which did provide a moderate bond strength. It is interesting to note that all of the silicone coating systems applied directly to the glass surface had noticeably poorer water repellency than did either the silicone or the stearic acid treated metal oxide system of Tests 1 and 2. The repellency observations included a noticeable difference in the water drop contact angle with the surface as well as water run-off observations.

Table VI incorporates data obtained from combination coatings using final organic compound treatments applied as solids to the glass test plate surfaces. Also included is a test made using a plate exposed to a vaporized organic. These differ from the earlier tests where the final coating treatment was made in solution form. Tests 1 through 5 used finely pulverized long chain organic compounds applied to the zirconium oxide coated substrate. This was done by simply rubbing the powder lightly over the surface of the plate using a dry cotton ball. This was followed by a 250° F. oven cure cycle. During the elevated temperature processing, the organic powder reached its melting point so as to effect an interaction with the metal oxide layer. (Rub-resistance tests made using this method on plates not elevated in temperature to the melting point of the pulverized organic have given noticeably poorer results). Test 6 shows a similar oxide coated plate that was simply placed in a well closed oven along with a separate container of an appropriate organic compound. In this case, the plate was exposed only to the vapor formed by the organic during the elevated temperature cycle.

TABLE VI

Comparative Rub Resistance Tests Between Final Treatment Methods Applied as Solids or in Vaporized Form vs. Solution Form Substrate: 8" × 8" ¼" Plate Glass

| | INITIAL COATING TREATMENT | | | FINAL COATING TREATMENT | | | Cure Cycle (b) | Abrasive Rub Resistance Test Results (c) |
|---|---|---|---|---|---|---|---|---|
| Test | Hydrated Metal Oxide | Formulation | Application Method | Material or Composition (p) | Formulation or Grade | Application Method | | |
| 1 | Zirconium (a) | ZC-24-4C6 (d) | Hand Method Using Cotton (e) | Stearic Acid (finely pulverized dry powder) | purified (i) | Powder Rubbed On Surface (f) | 250 F. - 45 min. | ~200 Rub Cycles |
| 2 | Zirconium (a) | ZC-24-4C6 (d) | Hand Method Using Cotton (e) | Palmitic acid (finely pulverized dry powder) | 95% (j) | Powder Rubbed On Surface (f) | 250 F. - 45 min. | ~75 Rub Cycles |
| 3 | Zirconium (a) | ZC-24-4C6 (d) | Hand Method Using Cotton (e) | Cetyl alcohol (finely pulverized dry powder) | 96% (k) | Powder Rubbed On Surface (f) | 250 F. - 45 min. | 100–125 Rub Cycles |
| 4 | Zirconium (a) | ZC-24-4C6 (d) | Hand Method Using Cotton (e) | Ammonium Stearate (finely pulverized dry powder) | (l) | Powder Rubbed On Surface (f) | 250 F. - 45 min. | ~300 Rub Cycles |
| 5 | Zirconium (a) | ZC-24-4C6 (d) | Hand Method Using Cotton (e) | Potassium Stearate (finely pulverized dry powder) | (m) | Powder Rubbed On Surface (f) | 250 F. - 45 min. | 125–150 Rub Cycles |

TABLE VI-continued

Comparative Rub Resistance Tests Between Final Treatment Methods
Applied as Solids or in Vaporized Form vs. Solution Form Substrate: 8" × 8" ¼" Plate Glass

| | INITIAL COATING TREATMENT | | | FINAL COATING TREATMENT | | | Cure Cycle (b) | Abrasive Rub Resistance Test Results (c) |
|---|---|---|---|---|---|---|---|---|
| Test | Hydrated Metal Oxide | Formulation | Application Method | Material or Composition (p) | Formulation or Grade | Application Method | | |
| 6 | Zirconium (a) | ZC-24-10M5 (p) | Hand Method Using Cotton (e) | 30 g Propylene Glycol 20 g 1-Propanol 0.5 g Stearic Acid | USP, technical (n) | Surface exposed to Vapor Only in Closed Oven (g) | 250 F. - 45 min. | ~300 Rub Cycles |
| 7 | Zirconium (a) | ZC-24-10M5 (p) | Hand Method Using Cotton (e) | 30 g Propylene Glycol 20 g 1-Propanol 0.5 g Stearic Acid | USP, technical (n) | Liquid Wiped On Surface (h) | 250 F. - 45 min. | ~300 Rub Cycles |

NOTES:
(a) See TABLE III, note (a).
(b) See TABLE IV, note (b).
(c) See TABLE III, note (c).
(d) See TABLE IV, note (g).
(e) See TABLE III, note (n).
(f) Same as TABLE IV, note (e) except that specified final treatment material was pulverized to a finely divided form and rubbed lightly onto the metal oxide coated surface using a dry cotton ball. A visible but thin layer of the powder adheres to the surface.
(g) Same as TABLE IV, note (e) except that the metal oxide coated plate was placed in a well closed oven along with a separate container of the organic solution so that final treatment consisted solely of exposure to vaporized fumes.
(h) Same as TABLE IV, note (e).
(i) See TABLE III, note (p).
(j) 95% Aldrich Chemical Co., 13008-7.
(k) 96% Aldrich Chemical Co., H680-0.
(l) Compounded from stearic acid, (see note (i) above) and ammonium hydroxide, laboratory grade.
(m) Compounded from stearic acid, (see note (i) above) and KOH, certified A.C.S.
(n) See TABLE III, note (p).
(o) See TABLE III, note (d).
(p) See note (f), TABLE III except that 24 g of the filtered oxide precipitate is mixed with 26 g of the water solution containing the indicated amount of methoxypolyethylene glycol as a lubricant.

As can be seen from the rub-resistance data in Table VI, some excellent results were obtained, some comparable to the more usual method of applying the final treatment in solution form. A typical solution applied example is shown as Test 7 for reference purposes. All tests in Table VI showed a very high degree of water repellency.

Table VII shows the effect of cure temperature variations for a test series run using final treatments of methanol, a methanol stearic acid mixture and a dimethylsilicone-methyl ethyl keytone mixture. Each of these coatings were evaluated for abrasive rub resistance immediately after application at room temperature or after a 30 minute cure cycle at 150° F., 250° F. or 350° F. as indicated in the Table. The customary cooling to room temperature, followed by a soap and water cleaning, was done prior to the rub testing.

The results indicate that the methanol treatment is the most sensitive to temperature variations while the silicone system is the least affected. The 350° F. cure cycle showed a detrimental effect on abrasive rub resistance for both of the organic final treatments. On the other hand the data tends to indicate that even higher temperatures than 350° F. could undoubtedly be used with the silicone treatment without degradation of the abrasive and bond strength properties. No differences were noted in water repellent characteristics and all test panels were highly water repellent.

TABLE VII

Comparative Abrasive Rub Resistance Tests, Using Organic and Silicone
Final Treatment Systems, As A Function of Final Cure Temperature Substrate: 8" × 8" ¼" Plate Glass

| | INITIAL COATING TREATMENT | | | FINAL COATING TREATMENT | | | Cure Cycle (b) | Abrasive Rub Resistance Test Results (c) |
|---|---|---|---|---|---|---|---|---|
| Test | Hydrated Metal Oxide | Formulation | Application Method | Material or Composition (d) | Formulation or Grade | Application Method | | |
| 1 | Zirconium (a) | ZC-24-10M5 (k) | Hand Method Using Cotton (e) | Methanol | commercial (g) | Liquid Wiped On Surface (f) | Room Temperature | 150-200 Rub Cycles |
| 2 | Zirconium (a) | ZC-24-10M5 (k) | Hand Method Using Cotton (e) | Methanol | commercial (g) | Liquid Wiped On Surface (f) | 150 F. - 45 min. | 200-250 Rub Cycles |
| 3 | Zirconium (a) | ZC-24-10M5 (k) | Hand Method Using Cotton (e) | Methanol | commercial (g) | Liquid Wiped On Surface (f) | 250 F. - 45 min. | 200-250 Rub Cycles |
| 4 | Zirconium (a) | ZC-24-10M5 (k) | Hand Method Using Cotton (e) | Methanol | commercial (g) | Liquid Wiped On Surface (f) | 350 F. - 45 min. | 150-200 Rub Cycles |
| 5 | Zirconium (a) | ZC-24-10M5 (k) | Hand Method Using Cotton (e) | 100 g Methanol 1 g Stearic Acid | commercial (h) purified (i) | Liquid Wiped On Surface (f) | Room Temperature | ~250 Rub Cycles |
| 6 | Zirconium (a) | ZC-24-10M5 (k) | Hand Method Using Cotton (e) | 100 g Methanol 1 g Stearic Acid | commercial (h) purified (i) | Liquid Wiped On Surface (f) | 150 F. - 45 min. | 250-300 Rub Cycles |
| 7 | Zirconium (a) | ZC-24-10M5 (k) | Hand Method Using Cotton (e) | 100 g Methanol 1 g Stearic Acid | commercial (h) purified (i) | Liquid Wiped On Surface (f) | 250 F. - 45 min. | ~300 Rub Cycles |

TABLE VII-continued

Comparative Abrasive Rub Resistance Tests, Using Organic and Silicone Final Treatment Systems, As A Function of Final Cure Temperature Substrate: 8" × 8" ¼" Plate Glass

| | INITIAL COATING TREATMENT | | | FINAL COATING TREATMENT | | | Cure Cycle (b) | Abrasive Rub Resistance Test Results (c) |
|---|---|---|---|---|---|---|---|---|
| Test | Hydrated Metal Oxide | Formulation | Application Method | Material or Composition (d) | Formulation or Grade | Application Method | | |
| 8 | Zirconium (a) | ZC-24-10M5 (k) | Hand Method Using Cotton (e) | 100 g Methanol 1 g Stearic Acid | commercial (n) purified (i) | Liquid Wiped On Surface (f) | 350 F. - 45 min. | ~200 Rub Cycles |
| 9 | Zirconium (a) | ZC-24-10M5 (k) | Hand Method Using Cotton (e) | 100 g Methyl ethyl Keytone 1 g Dimethyl-Silicone (1000 centistoke) | certified ACS technical (j) | Liquid Wiped On Surface (f) | Room Temperature | 250-300 Rub Cycles |
| 10 | Zirconium (a) | ZC-24-10M5 (k) | Hand Method Using Cotton (e) | 100 g Methyl ethyl Keytone 1 g Dimethyl-Silicone (1000 centistoke) | | Liquid Wiped On Surface (f) | 150 F. - 45 min. ature | 350-400 Rub Cycles |
| 11 | Zirconium (a) | ZC-24-10M5 (k) | Hand Method Using Cotton (e) | 100 g Methyl ethyl Keytone 1 g Dimethyl-Silicone (1000 centistoke) | | Liquid Wiped On Surface (f) | 250 F. - 45 min. ature | 350-400 Rub Cycles |
| 12 | Zirconium (a) | ZC-24-10M5 (k) | Hand Method Using Cotton (e) | 100 g Methyl ethyl Keytone 1 g Dimethyl-Silicone (1000 centistoke) | | Liquid Wiped On Surface (f) | 350 F. - 45 min. ature | 400+ Rub Cycles |

NOTES:
(a) See TABLE III, note (a).
(b) See TABLE V, note (a).
(c) See TABLE III, note (c).
(d) See TABLE III, note (d).
(e) See TABLE III, note (n).
(f) See TABLE IV, note (f).
(g) See TABLE IV, note (n).
(h) See TABLE III, note (o).
(i) See TABLE III, note (p).
(j) See TABLE IV, note (j).
(k) See TABLE III, note (f) except that 24 g of the filtered oxide precipitate is mixed with 26 g of water solution containing the indicated amount of methoxyethylene glycol as a lubricant.

Table VIII covers special tests made to evaluate abrasive rub resistance as a function of cure time. All of these tests were conducted at room temperature, in this instance about 65°-68° F. As in most other tests, the final coating treatment was applied to the metal oxide layer and left on the surface of the test plates for 20-40 minutes before washing away the excess coating material or residue with soap and water. One panel of each of the three coating systems was rub tested promptly after application. The others were left exposed to the normal laboratory environment, (placed in a vertical position at the back of a bench), until tested during the following 1-4 week period as indicated in the Table. Note that Tests 3 through 7 used 10 g of calcium carbonate per 100 g H$_2$O as the abrasive test media rather than the 7½ g of calcium carbonate per 100 g H$_2$O used in all preceding Tables.

TABLE VIII

Comparative Abrasive Rub Resistance Tests As A Function of Length of Room Temperature Cure Time For Organic and Silicone Final Coating Treatment Systems Substrate: 8" × 8" ¼" Plate Glass

| | INITIAL COATING TREATMENT | | | FINAL COATING TREATMENT | | | Time Cured at Room Temperature (b) | Abrasive Rub Resistance Test Results (c) |
|---|---|---|---|---|---|---|---|---|
| Test | Hydrated Metal Oxide | Formulation | Application Method | Material or Composition (d) | Formulation or Grade | Application Method | | |
| 1 | Zirconium (a) | ZC-24-10M5 (l) | Hand Method Using Cotton (e) | 100 g Methanol 1 g Stearic Acid | commercial (g) purified (h) | Immersed in Liquid (k) | ½ hour | 200-300 Rub Cycles |
| 2 | Zirconium (a) | ZC-24-10M5 (l) | Hand Method Using Cotton (e) | 100 g Methanol 1 g Stearic Acid | commercial (g) purified (h) | Immersed in Liquid (k) | 7 days | ~500~ Rub Cycles |
| 3 | Zirconium (a) | ZC-24-10M5 (l) | Hand Method Using Cotton (e) | 100 g Methanol 0.5 g Methyl-Stearate | certified ACS reagent (i) | Liquid Wiped On Surface (f) | ½ hour | ~425 Rub Cycles |
| 4 | Zirconium (a) | ZC-24-10M5 (l) | Hand Method Using Cotton (e) | 100 g Methanol 0.5 g Methyl-Stearate | certified ACS reagent (i) | Liquid Wiped On Surface (f) | 8 days | ~550 Rub Cycles |
| 5 | Zirconium (a) | ZC-24-10M5 (l) | Hand Method Using Cotton (e) | 100 g Methyl ethyl Keytone 1 g Dimethyl-Silicone (1000 centistoke) | certified ACS technical (j) | Liquid Wiped On Surface (f) | 2½ hours | ~325 Rub Cycles |
| 6 | Zirconium (a) | ZC-24-10M5 (l) | Hand Method | 100 g Methyl | certified ACS | Liquid | 8 days | ~400 |

TABLE VIII-continued

Comparative Abrasive Rub Resistance Tests As A Function of Length of
Room Temperature Cure Time For Organic and Silicone Final Coating Treatment Systems Substrate: 8" × 8" ¼" Plate Glass

| Test | INITIAL COATING TREATMENT | | | FINAL COATING TREATMENT | | | Time Cured at Room Temperature (b) | Abrasive Rub Resistance Test Results (c) |
|---|---|---|---|---|---|---|---|---|
| | Hydrated Metal Oxide | Formulation | Application Method | Material or Composition (d) | Formulation or Grade | Application Method | | |
| | | | Using Cotton (e) | ethyl Keytone 1 g Dimethyl-Silicone (1000 centistoke) | technical (j) | Wiped On Surface (f) | | Rub Cycles |
| 7 | Zirconium (a) | ZC-24-10M5 (l) | Hand Method Using Cotton (e) | 100 g Methyl ethyl Keytone 1 g Dimethyl-Silicone (1000 centistoke) | certified ACS technical (j) | Liquid Wiped On Surface (f) | 30 days | ~400 Rub Cycles |

(a) See TABLE III, note (a).
(b) Test plates maintained at room temperature of 65–68 F., exposed to laboratory environment for length of time indicated prior to abrasive rub resistance testing.
(c) See TABLE III, note (c) for Tests 1 and 2. Tests 3 through 7 same except used 10 g CaCO₃ ATOMITE with 100 g H₂O as abrasive media for rub resistance test.
(d) See TABLE III, note (d).
(e) See TABLE III, note (n).
(f) See TABLE III, note (e) except that repellency and abrasion rub resistance tests made at end of room temperature cure period indicated in Table.
(g) See TABLE III, note (o).
(h) See TABLE III, note (p).
(i) Eastman Chemical Co., #1204.
(j) See TABLE IV, note (j).
(k) Metal oxide coated plates immersed in final treatment solution for approximately 2 minutes before removing to air dry at room temperature for 20 to 30 minutes. Non-reacted residue then removed from surface by washing with IVORY soap and warm water. Repellency and abrasive rub resistance tests made at end of the room temperature cure period indicated in TABLE.
(l) See TABLE III, note (f).

Methanol-stearic acid, methanol-methyl stearate and methyl-ethyl keytone-dimethylsilicone formulations were each evaluated in this manner and all showed a definite increase in abrasive rub resistance with time. In addition, it has been observed from a number of tests that a long cure time at room temperature is usually more effective than an accelerated cure at an elevated temperature. Comparisons of this type can be seen by comparing abrasive rub resistance data between identical formulations of Tables VII and VIII.

This test data along with other results not included here, suggests some type of interaction that is slowly taking place between the metal oxide layer and the final treatment material and/or between the metal oxide layer and the glass surface. Perhaps both effects may be involved. Possible reactions could include a slowly occurring molecular reorientation between the combination coating components. It also may involve loss of waters of hydration at the metal oxide and possibly replacement of waters of hydration with the organic, silicon or fluorocarbon constituent.

Although not specifically mentioned earlier, tests have been made in which the pressure used during the physical application of the metal oxide water based suspensions have been varied from very heavy to very light pressures. The results obtained showed no noticeable effect on either water repellency or abrasive rub resistance. Similar tests were made with the final treatment solutions where application ranged from heavy rubbing to simply dipping the test plate into the solution with no rubbing at all. Again no noticeable difference in final test results of the coated plates were noted.

Variations in the amount of stearic acid added to solvents such as methanol have also been found to be non-critical. The main objective appears to be only that enough be present to react with the metal oxide layer. However, any excess can be easily removed with soap and water washing.

The elapsed time between applying the metal oxide layer and the final treatment has been found to be relatively non-critical and no measurable differences have been noted within time differences of a few minutes to 24 hours. It has, however, been found to be important to use a sufficient amount of the metal oxide suspension during the coating application to assure complete coverage of the substrate during the wiping operation from the wet to the dry or nearly dry stage.

The combination coatings of this invention have been found to exhibit a high degree of oil repellency in addition to their inherent water repellency. For example, a thin oil such as "3-in-1" oil rubbed onto the surface of a properly coated glass plate, such as that of Test 2 shown in Table VII comprising a zirconium oxide/stearic acid system, will quickly congeal into small beads on the surface. The same test made on an uncoated glass plate will leave the oil adhering to the surface in a continuous film.

A zirconium oxide/stearic acid combination coating system identical to that used in Test 26 of Table IV has been applied to the glass lenses of eyeglasses. These have been in continual wearer use for well over a year at this point in time. Even though no elevated cure temperature was used in their preparation, no sign of coating wear has occurred. It is expected that the original coating will be good for the life of the eyeglasses since natural oils from the skin or from the organic salts in soap and the like ocassionally used to clean the lenses will renew any organic component replacement that may be required. The lenses are as highly water repellent as when first applied, allowing excellent visibility under rain and water spray conditions since water cannot "sheet" on the glass.

Because of the inherent oil repellency characteristics of these coatings, it has also been found to be easy to remove fingerprint and oil contamination from the treated eyeglasses by lightly wiping the lenses with a dry cloth or KLEENEX. Such contamination is quickly transferred to the toweling rather than, as in the case of lenses not coated with this system, being spread over the surface of the glass.

Another application for this combination coating system involves the treating of pouring spouts on various types of pouring vessels. Coatings for this purpose have been applied and are presently on long term test using PYREX coffee pots and measuring cups, CORNINGWARE tea pots and CORELLE creamers. The coatings have been applied only to the pouring area using a coating system similar to that shown in Test 26 of Table IV. In addition to providing a high degree of repellency to many liquids, an excellent coating-to-substrate bond has been achieved and verified by abrasive rub tests for each of these specific glass or glass-ceramic materials.

The use of the combination coating according to this invention has been found to substantially eliminate dripping or the occurrence of liquid running down the outside of the vessel when it is righted after the pouring operation. The longest test evaluation at this point involves a PYREX coffee pot that has been in continuous use for more than 8 months and is still providing drip free operation. It is now believed that the natural oils in the coffee, cream or other liquids being poured, or organics in the soap used to wash the vessels, will maintain the coating in a highly water repellent condition on an almost continuous basis.

Ceramic wall tiles in a shower have been treated with a single application formulation, type SAA-24 shown earlier in Table II. The tiles and surrounding grout have consistently shown a very high degree of water repellency compared to adjacent untreated areas. The tiles are also very easy to keep clean of soap and water stains. Formulation SAA-24 when applied to a plate glass test panel showed an abrasive rub resistance of 300–350 cycles, when tested immediately after application, using the test method of Table III.

Certain versions of these combination coating systems have been found to make excellent water repellent coatings for glass or glazed ceramic electrical insulators. High voltage tests have shown very high resistance to electrical breakdown using either the aluminum oxide or zirconium oxide initial treatment methods of the invention. While dimethylsilicones, fluorosilicones and high dielectric fluorocarbons have been found in genral to give excellent results as the final coating treatment, a more careful selection must be made when using an organic. For example, spark plugs subjected to salt water spray tests were found to provide excellent water repellency and continued to fire when using stearic acid as the final coating treatment. However, the substitution of potassium stearate or triethanolamine stearate for the stearic acid resulted in almost immediate electrical breakdown and failure to fire, at least equivalent to non-treated plugs. For electrical insulator applications of this type, an elevated temperature cure cycle of 200°–400° F. has normally been used in order to remove any inherent moisture that may still be included in the combination coating.

More specifically, spark plug combination coating systems that have provided excellent water repellency and high voltage breakdown characteristics as compared to non-treated plugs have included the following:
zirconium oxide/stearic acid
aluminum oxide/stearic acid
aluminum oxide/silicon These were applied in two steps using formulations similar to that shown in Table IV, Test 26. Also, a single application step coating system, formulation SAA-8 as shown in Table II has provided excellent results. A number of other organics, silicones, fluorosilicones and fluorocarbons possessing high dielectric properties would be expected to make similarly good candidates as coating constituents for this combination system. At this point, only the aluminum and zirconium oxides have been evaluated for this electrical insulator application. Since water and oil repellency may be more important than abrasive rub resistance in many insulator applications, other metal oxides may also be found to be suitable.

A number of long term water immersion tests have been made using a variety of these combination coating formulations. Examples of some of these tests are shown in Table IX. Each test coating was applied to the outside surface of a ¾" diameter PYREX tube and, after various immersion times under water, was removed and tested for coating-to-substrate bond strength. This test was performed by hand by rubbing with a vigorous back and forth motion in a single area, with as much pressure as possible, using a wet paper towel.

Probably due to the inherent nature of the particular organic or silicone final treatment involved in these tests, all coatings showed good to excellent water repellency at the end of the immersion periods. However, considerable differences were found in the rub resistance results.

All tests using zirconium oxide or iron oxide showed no loss of bond strength during the duration of the tests. However, coatings using aluminum oxide showed marked loss of bonding to the substrate as indicated by the rub test data after as little as two days of immersion time. It is interesting to note from Test 6 in the Table that using a 50-50 mixture of aluminum oxide and zirconium oxide, as the initial metal oxide coating treatment, rather than aluminum oxide by itself still showed excellent bonding after a month under water. Apparently the presence of the zirconium oxide preserved the water resistant integrity of this particular mixed oxide coating system.

TABLE IX

Water Immersion Tests and Its Effect On Water Repellency and Coating-to-Substrate Bond Strength Substrate: ¾" o.d. × 6" long PYREX glass tubes

| Test | INITIAL TREATMENT Hydrated (a) Metal Oxide | Formulation | FINAL TREATMENT Material or Mixture | Formulation or Grade | Cure Cycle (b) | Immersion Media | Immersion Period | Water Repellency (c) | Coating-to-Substrate Bond Strength (d) |
|---|---|---|---|---|---|---|---|---|---|
| 1 | Aluminum | 0-2 (e) | 40 g Propylene glycol 10 g 1-Propanol 1 g Stearic Acid | USP technical purified (j) | Room Temperature | Tap Water | 2 days | good beading | rubs through easily |
| 2 | Aluminum | 0-F (f) | Dimethylsilicone (1000 centistoke) | technical (l) | Room Temperature | Tap Water | 2 days | good beading | rubs through easily |
| 3 | Zirconium | 0-3 (g) | 40 g Propylene glycol 10 g 1-Propanol 1 g Stearic Acid | USP technical purified (j) | Room Temperature | Tap Water | 27 days | excellent beading | cannot rub through coating |
| 4 | Nickel | 0-11 (h) | 40 g Propylene glycol | USP | Room | Tap | 27 days | excellent | can rub through |

TABLE IX-continued

Water Immersion Tests and Its Effect On Water Repellency and Coating-to-Substrate Bond Strength Substrate: 3/4" o.d. × 6" long PYREX glass tubes

| Test | INITIAL TREATMENT Hydrated (a) Metal Oxide | Formulation | FINAL TREATMENT Material or Mixture | Formulation or Grade | Cure Cycle (b) | Immersion Media | Immersion Period | Water Repellency (c) | Coating-to-Substrate Bond Strength (d) |
|---|---|---|---|---|---|---|---|---|---|
| 5 | Iron | 0-5 (i) | 10 g 1-Propanol 1 g Stearic Acid 40 g Propylene glycol 10 g 1-Propanol 1 g Stearic Acid | technical purified (j) USP technical purified (j) | Temperature Room Temperature | Water Tap Water | 26 days | beading excellent beading | coating with effort cannot rub through coating |
| 6 | Aluminum Zirconium mixture | 0-2 + 0-3 (1:1) (e) (g) | 40 g Propylene glycol 10 g 1-Propanol 1 g Stearic Acid | USP technical purified (j) | Room Temperature | Tap Water | 26 days | excellent beading | cannot rub through coating |
| 7 | Zirconium | 0-3 (g) | 40 g Propylene glycol 10 g 1-Propanol 1 g Stearic Acid | USP technical purified (j) | 300 F. - 45 min. | Sea Water | 66 days | excellent beading | cannot rub through coating |
| 8 | Zirconium | 0-3 (g) | High Vacuum Silicone Grease | technical (k) technical | 300 F. - 45 min. | Tap Water | 25 days | Excellent beading | cannot rub through coating |
| 9 | Zirconium | 0-3 (g) | Dimethylsilicone fluid SF-1093 | technical (n) technical | 300 F. - 45 min. | Tap Water | 25 days | Excellent beading | cannot rub through coating |
| 10 | Zirconium | 0-3 (g) | Chlorophenyl Methyl siloxane F-50 | technical (m) technical | 300 F. - 45 min. | Tap Water | 19 days | Excellent beading | cannot rub through coating |
| 11 | None | — | Chlorophenyl Methyl siloxane F-50 | technical (m) | Room Temperature | Tap Water | 13 days | good beading | rubs through very easily |
| 12 | None | — | High Vacuum Silicone Grease | technical (k) | Room Temperature | Tap Water | 13 days | good beading | rubs through very easily |
| 13 | None | — | 100 g 1-Propanol 1 g Stearic Acid | technical purified (j) | 250 F. - 45 min. | Tap Water | 3 days | fair beading | rubs through very easily |

NOTES:
(a) See TABLE III, note (a).
(b) See TABLE III, note (b).
(c) Tested by removing from water and noting rapidity of water run-off. Also tested by noting beading when subjected to fine water spray.
(d) Tested by rubbing glass tube with wet paper towel using back and forth motion in same area with as much pressure as possible applied by one finger.
(e) Filtered precipitate prepared from aluminum sulfate, $Al_2(SO_4)_3.nH_2O$, per note (a) and made into a relatively thick, just barely flowable suspension by adding additional water to the oxide precipitate from the initial vacuum filtering and washing operation using a high speed blender.
(f) Same as note (e) except precipitate purchased in ready to use form as aluminum hydroxide gel, $Al(OH)_3.nH_2O$ from Fisher Scientific Company as #A-583.
(g) Same as note (e) except prepared from zirconium oxychloride, $ZrOCL_2.8\ H_2O$.
(h) Same as note (e) except prepared from nickel chloride, $NiCl_2.6\ H_2O$.
(g) Same as note (e) except prepared from iron chloride, $FeCl_3.6\ H_2O$.
(j) See TABLE III, note (p).
(k) Dow Corning Company
(l) See TABLE IV, note (j).
(m) General Electric Co., High Temperature Silicone Lubricant.
(m) General Electric Co., Silicone with Oxidation Inhibitor.

Note that Test 7 in Table IX using zirconium oxide, was immersed under sea water rather than tap water and still showed no loss of repellency or rub resistance when tested after two months of immersion.

Tests 11, 12 and 13, using only the organic component of the coating applied directly to the glass tube (no metal oxide initial treatment), are included in Table IX for reference purposes only. All showed easy coating breakthrough when rubbed using the wet paper towel test method.

The combination coatings according to this invention have been found to be highly water repellent when applied to a variety of precleaned, smooth metal surfaces. Metals tested in this manner using formulations such as shown in Tests 2 and 6 of Table VII include: steel, aluminum, copper, chromium, zinc, brass, silver and stainless steel.

The preceding disclosure and examples are intended to illustrate and not to limit this invention. Variations and modifications can be made therein without departing from its intended scope.

What is claimed is:

1. A method of forming a water and oil repellent combination coating on a substrate selected from the group consisting of glass, tile, ceramic, porcelain, metals and metal oxides, paints, enamels and organic materials containing sizable amounts of inorganics on or in the surface which comprises the steps of:

applying a liquid based suspension of a hydrated oxide and/or hydroxide of a metal selected from the group consisting of zirconium, aluminum, iron, chromium, tin, titanium, nickel, cobalt, cerium, and mixtures thereof to the surface of the substrate by rubbing the suspension uniformly over the surface while permitting the liquid base to evaporate until the surface is dry or nearly dry and a coating of the oxide is deposited on the substrate surface; and, treating the oxide and/or hydroxide coating with a combining compound selected from the group consisting of an organic compound, a silicone compound and a fluorocarbon compound and mixtures thereof which combines therewith to form a water and oil repellent and abrasion resistant combined coating on the substrate.

2. The method of claim 1 wherein the oxide and/or hydroxide is selected from the group consisting of zirconium, aluminum, iron, chromium, tin and titanium, and mixtures thereof.

3. The method of claim 1 wherein the combining compound is selected from the group consisting of:
(1) stearic acid
(2) palmitic acid
(3) myristic acid
(4) oleic acid
(5) linoleic acid
(6) linolenic acid (7) methyl stearate
(8) potassium stearate
(9) sodium stearate
(10) ammonium stearate
(11) triethanolamine stearate
(12) potassium palmitate
(13) sodium palmitate
(14) ammonium palmitate
(15) triethanolamine palmitate
(16) potassium myristate
(17) sodium myristate
(18) ammonium myristate
(19) triethanolamine myristate
(20) potassium oleate
(21) sodium oleate
(22) ammonium oleate
(23) triethanolamine oleate
(24) naptha
(25) n-hexadecane
(26) cetyl alcohol
(27) lanolin
(28) acetone
(29) methyl ethyl keytone
(30) methanol
(31) isopropanol
(32) 2-propanol
(33) 1-pentanol
(34) 1,6-hexanediol
(35) hexyl alcohol
(36) heptal alcohol
(37) 1,1,1-trichloroethane
(38) tetrachloroethylene
(39) methyl chloride
(40) methylene chloride
(41) carbon tetrachloride
(42) mineral spirits
(43) mineral oil
(44) paraffin
(45) Stoddard solvent
(46) lanolin
(47) polydimethylsiloxane
(48) dimethylsilicone wax
(49) methylalkylpolysiloxane
(50) chlorophenylmethylsiloxane
(51) fluorodimethylsiloxane
(52) fluorocarbon
(53) hydroxy terminated (SiOH) dimethyl reactive silicone and mixtures thereof.

4. The method of claim 1 wherein the oxide slurry includes an effective amount of a lubricity agent selected from the group consisting of polyethylene glycol, alkoxypolyethylene glycol and mixtures thereof.

5. The method of claim 1 wherein the combining compound is a silicone.

6. The method of claim 3 wherein the combining compound comprises a mixture of a heat evaporative organic solvent and/or a solid organic compound or viscous organic liquid and mixtures thereof.

7. The method of claim 6 wherein the combining compound mixture is of methanol and stearic acid.

8. The method of claim 6 wherein the combining compound mixture is of methyl-ethyl keytone and dimethylsilicone.

9. The method of claim 7 or 8 including adding propylene glycol as an extender.

10. The method of claim 6 wherein the evaporative organic solvent is selected from the group consisting of:
(1) naptha
(2) n-hexadecane
(3) cetyl alcohol
(4) acetone
(5) methyl ethyl keytone
(6) isopropanol
(7) 2-propanol
(8) 1-pentanol
(9) 1,6-hexanediol
(10) hexyl alcohol
(11) heptal alcohol
(12) 1,1,1-trichloroethane
(13) tetrachloroethylene
(14) methyl chloride
(15) methylene chloride
(16) carbon tetrachloride and mixtures thereof and the solid organic compound and viscous organic liquid is selected from the group consisting of:
(17) stearic acid
(18) palmitic acid
(19) myristic acid
(20) oleic acid
(21) linoleic acid
(22) linolenic
(23) methyl stearate
(24) potassium stearate
(25) sodium stearate
(26) ammonium stearate
(27) triethanolamine stearate
(28) potassium palmitate
(29) sodium palmitate
(30) ammonium palmitate
(31) triethanolamine palmitate
(32) potassium myristate
(33) sodium myristate
(34) ammonium myristate
(35) triethanolamine myristate
(36) potassium oleate
(37) sodium oleate
(38) ammonium oleate
(39) triethanolamine oleate
(40) lanolin
(41) polydimethylsiloxane
(42) dimethylsilicone wax
(43) methylalkylpolysiloxane
(44) chlorophenylmethylsiloxane
(45) fluorodimethylsiloxane
(46) fluorocarbon and mixtures thereof.

11. The method of claim 1 wherein the oxide coating is treated by exposing the coating to a combining compound in vapor form.

12. The method of claim 1 wherein the organic coating is heated to provide an accelerated cure thereof.

13. The method of claim 12 wherein the organic compound is vaporized by heating to a vapor and contacting the oxide coating with the vapors.

14. The method of claim 1 wherein the liquid base is water on the order of about 0 to about 70% and the oxide is a zirconium oxide precipitate containing from about 6 to about 7% by weight oxide when heated to about 250° F. for a period of time to remove substantially all of the water and a polyethylene glycol on the order of about 0.0 to about 0.05% by weight.

15. A water and oil repellent combination coating on a substrate selected from the group consisting of glass, tile, ceramic, porcelain, metals and metal oxides, paints, enamels and organic materials containing sizable amounts of inorganics on or in the surface which comprises a first layer adhered to the substrate by rubbing until at least nearly dry a hydrated oxide and/or hydroxide of a metal selected from the group consisting of zirconium, aluminum, iron, chromium, tin, titanium, nickel, cobalt, cerium and mixtures thereof and a second layer combined with the first layer comprising an organic compound selected from the group consisting of:
(1) stearic acid
(2) palmitic acid
(3) myristic acid
(4) oleic acid
(5) linoleic acid
(6) linolenic acid
(7) methyl stearate
(8) potassium stearate
(9) sodium stearate
(10) ammonium stearate
(11) triethanolamine stearate
(12) potassium palmitate
(13) sodium palmitate
(14) ammonium palmitate
(15) triethanolamine palmitate
(16) potassium myristate
(17) sodium myristate
(18) ammonium myristate
(19) triethanolamine myristate
(20) potassium oleate
(21) sodium oleate
(22) ammonium oleate
(23) triethanolamine oleate
(24) naptha
(25) n-hexadecane
(26) cetyl alcohol
(27) lanolin
(28) acetone
(29) methyl ethyl ketone
(30) methanol
(31) isopropanol
(32) 2-propanol
(33) 1-pentanol
(34) 1,6-hexanediol
(35) hexyl alcohol
(36) heptal alcohol
(37) 1,1,1-trichloroethane
(38) tetrachloroethylene
(39) methyl chloride
(40) methylene chloride
(41) carbon tetrachloride
(42) mineral spirits
(43) mineral oil
(44) paraffin
(45) Stoddard solvent
(46) lanolin
(47) polydimethylsiloxane
(48) dimethylsilicone wax
(49) methylalkylpolysiloxane
(50) chlorophenylmethylsiloxane
(51) fluorodimethylsiloxane
(52) fluorocarbon
(53) hydroxy terminated (SiOH) dimethyl reactive silicone and mixtures thereof.

16. A method of forming a water and oil repellent combination coating on a substrate selected from the group consisting of glass, tile, ceramic, porcelain, metals and metal oxides, paints, enamels and organic materials containing sizable amounts of inorganics on or in the surface which comprises the steps of:
mixing an amount of an aqueous slurry of an oxide and/or hydroxide of a metal selected from the group consisting of zirconium, aluminum, iron, chromium, tin, titanium, nickel, cobalt, cerium and mixtures thereof with an amount of an inert absorbent material selected from the group consisting of talc, mica, kaolin, delaminated kaolin, or other suitable suspension agent, and mixtures thereof with a water insoluble organic compound adapted to combine with the oxide to form a water repellent coating on the substrate; applying the resulting mixture to the surface of the substrate and rubbing the mixture onto the surface of the substrate until nearly all or all of the moisture evaporates leaving an oil and water repellent coating thereon.

17. The method of claim 16 wherein the inert material is talc.

18. The method of claim 16 wherein the inert material is kaolin.

19. The method of claim 16 wherein the mixture includes a lubricity agent selected from the group consisting of methoxypolyethylene glycol, propylene glycol, polyethylene glycol and mixtures thereof.

20. The method of claim 1 wherein the substrate is selected from the group consisting of glass, tile, ceramic, porcelain, steel, aluminum, copper, chromium, zinc, brass, silver and stainless steel.

21. The method of claim 1 wherein the substrate is a metal selected from the group consisting of steel, aluminum, copper, chromium, zinc, brass, silver and stainless steel.

22. The method of claim 1 wherein the oxide is about half and half zirconium oxide and aluminum oxide.

23. The combination coating of claim 15 wherein the oxide and combining compound combination is selected from the group consisting of zirconium oxide and stearic acid; aluminum oxide and stearic acid; and, aluminum oxide and a silicone.

24. The method of claim 1 wherein the oxide is selected from the group consisting of aluminum oxide and zirconium oxide and the combining compound is selected from the group consisting of stearic acid and silicone.

25. The method of claim 1 wherein the oxide and/or hydroxide is selected from the group consisting of zirconium and chromium and mixtures thereof.

26. The method of claim 1 wherein the oxide and/or hydroxide is of zirconium.

27. The method of claim 1 wherein the combining compound is a fluorocarbon.

28. The method of claim 1 wherein the oxide is about half and half zirconium oxide and chromium oxide.

29. The method of claim 1 wherein the oxides and/or hydroxides are selected from the group of mixed and coprecipitated oxides of zirconium and chromium.

30. The method of claim 1 wherein the oxides and/or hydroxides are selected from the group of zirconium, chromium and iron oxides and mixtures thereof.

31. A method of forming a water and oil repellent combination coating on a substrate selected from the group consisting of glass, tile, ceramic, porcelain, metals and metal oxides, paints, enamels and organic materials containing sizable amounts of inorganics on or in the surface which comprises the steps of:
mixing an amount of an aqueous slurry of an oxide and/or hydroxide of a metal selected from the group consisting of zirconium, aluminum, iron, chromium, tin, titanium, nickel, cobalt, cerium and mixtures thereof with an amount of an inert absorbent material and a water insoluble organic compound adapted to combine with the oxide to form a water repellent coating on the substrate; applying the resulting mixture to the surface of the substrate and rubbing the mixture onto the surface of the substrate until all or nearly all of the moisture evaporates leaving an oil and water repellent coating thereon.

32. The method of producing on a receptive substrate selected from the group consisting of glass, tile, ceramic, porcelain, metals and metal oxides, paints, enamels and organic materials containing sizable amounts of inorganics on or in the surface, a water and oil repellent surface coating, comprising rubbing an aqueous slurry of highly hydrated metal oxide onto said substrate until it is dry or nearly dry to form an organic-receptive prime coat, and applying over said prime coat a combining compound containing carbon atoms which combines with the prime coat to provide water and oil repellency.

33. The method of claim 32 wherein the hydrated oxide comprises a metal selected from the class consisting of zirconium, aluminum, iron, chromium, tin and titanium.

34. The method of claim 33 wherein the combining compound is selected from the class consisting of alcohols, ketones, hydrocarbons, chlorinated hydrocarbons, fatty acids, fatty acid soaps, natural oils, silicones, fluorocarbons, and combinations thereof.

35. The method of claim 34 wherein the surface coating is transparent and abrasion resistant and the oxide comprises an oxide of zirconium, tin, chromium and iron.

36. A substrate selected from the group consisting of glass, tile, ceramic, porcelain, metals and metal oxides, paints, enamels and organic materials containing sizable amounts of inorganics on or in the surface having a water and oil repellent and abrasion resistant surface coating formed by rubbing an aqueous slurry of highly hydrated metal oxide onto said substrate until it is dry or nearly dry to form an organic-receptive prime coat and applying over said prime coat a combining compound containing carbon atoms which combines with the prime coat to provide water and oil repellency.

37. The coated substrate of claim 36 wherein said highly hydrated metal oxide is zirconium oxide and said combining compound is stearic acid.

38. The method of claim 32 wherein the aqueous slurry is rubbed onto the substrate by means of a cotton ball.

39. The substrate of claim 36 wherein the aqueous slurry is rubbed onto the substrate by means of a cotton ball.

40. A substrate selected from the group consisting of glass, tile, ceramic, porcelain, metals and metal oxides, paints, enamels and organic materials containing sizable amounts of inorganics on or in the surface having a metal oxide coating adhered thereto forming an organic receptive prime coat and a combining compound coating thereon containing carbon atoms combined with the prime coat providing a combined water and oil repellent coating.

41. The article of claim 40 wherein the substrate is a silica based optical eye glass lense.

42. The article of claim 40 wherein the oxide is of a metal selected from the group consisting of zirconium, aluminum, iron, chromium, tin and titanium.

43. The article of claim 40 wherein the combining compound is selected from the class consisting of alcohols, ketones, hydrocarbons, chlorinated hydrocarbons, fatty acids, fatty acid soaps, natural oils, silicones, fluorocarbons, and combinations thereof.

* * * * *